United States Patent
Eika et al.

(10) Patent No.: US 10,016,686 B2
(45) Date of Patent: Jul. 10, 2018

(54) GAME CONTROL DEVICE, GAME CONTROL METHOD, A NON-TRANSITORY COMPUTER-READABLE RECORDING MEDIUM, AND GAME SYSTEM

(71) Applicant: KONAMI DIGITAL ENTERTAINMENT CO., LTD., Tokyo (JP)

(72) Inventors: Takuro Eika, Kawasaki (JP); Takayuki Takahara, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 368 days.

(21) Appl. No.: 14/373,870

(22) PCT Filed: Nov. 26, 2012

(86) PCT No.: PCT/JP2012/007566
§ 371 (c)(1),
(2) Date: Jul. 23, 2014

(87) PCT Pub. No.: WO2013/111227
PCT Pub. Date: Aug. 1, 2013

(65) Prior Publication Data
US 2015/0238856 A1 Aug. 27, 2015

(30) Foreign Application Priority Data

Jan. 23, 2012 (JP) .................. 2012-011571
Nov. 26, 2012 (JP) .................. 2012-257263

(51) Int. Cl.
A63F 13/35 (2014.01)
A63F 13/70 (2014.01)
(Continued)

(52) U.S. Cl.
CPC .............. *A63F 13/79* (2014.09); *A63F 13/10* (2013.01); *A63F 13/358* (2014.09);
(Continued)

(58) Field of Classification Search
CPC ........ A63F 13/79; A63F 13/525; A63F 13/12; A63F 13/10; A63F 13/35; A63F 13/70; A63F 2300/406; A63F 2300/5546
See application file for complete search history.

(56) References Cited

U.S. PATENT DOCUMENTS

| 5,405,151 A | * | 4/1995 | Naka | .................. A63F 13/10 345/684 |
| 5,411,270 A | * | 5/1995 | Naka | .................. A63F 13/10 463/33 |

(Continued)

FOREIGN PATENT DOCUMENTS

| JP | 2003-144759 A | 5/2003 |
| JP | 2004-105444 A | 4/2004 |
| JP | 2004-160059 A | 6/2004 |

OTHER PUBLICATIONS

International Search Report in PCT/JP2012/007566 dated Feb. 26, 2013.
(Continued)

*Primary Examiner* — Omkar Deodhar
*Assistant Examiner* — Matthew D. Hoel

(57) ABSTRACT

A game control device includes: an acquirer configured to acquire user access information for a user of a game; a calculator configured to calculate a number of users accessing the game during a period of time or a number of users accessing the game at a greater frequency than a given value, based on the user access information acquired by the acquirer; and a display controller configured to display a larger region in a game image visible by a game-playing (Continued)

user, as the number of users calculated by the calculator increases.

9 Claims, 24 Drawing Sheets

(51) Int. Cl.
  *A63F 13/79*    (2014.01)
  *A63F 13/525*   (2014.01)
  *A63F 13/40*    (2014.01)
  *A63F 13/358*   (2014.01)

(52) U.S. Cl.
  CPC ............ *A63F 13/525* (2014.09); *A63F 13/70* (2014.09); *A63F 2300/406* (2013.01); *A63F 2300/5546* (2013.01)

(56) References Cited

U.S. PATENT DOCUMENTS

| | | | | |
|---|---|---|---|---|
| 5,411,272 A * | 5/1995 | Naka | ...................... | G09G 1/007 345/473 |
| 5,470,080 A * | 11/1995 | Naka | ...................... | A63F 13/10 463/33 |
| 5,519,825 A * | 5/1996 | Naughton | ............... | G06T 13/00 345/473 |
| 5,650,941 A * | 7/1997 | Coelho | ................. | G06T 15/005 345/501 |
| 5,707,288 A * | 1/1998 | Stephens | ................. | A63F 13/00 345/418 |
| 5,752,239 A * | 5/1998 | Coutts | ..................... | A63F 13/00 345/419 |
| 5,879,236 A * | 3/1999 | Lambright | .............. | A63F 13/12 463/42 |
| 5,935,003 A * | 8/1999 | Stephens | ................. | A63F 13/00 345/418 |
| 6,155,923 A * | 12/2000 | Stephens | ................. | A63F 13/00 345/214 |
| 6,468,157 B1 * | 10/2002 | Hinami | ................... | A63F 13/10 345/419 |
| 6,527,637 B2 * | 3/2003 | Fujioka | .................... | G09G 5/34 463/30 |
| 6,639,606 B1 * | 10/2003 | Choi | ...................... | G06F 3/0481 715/700 |
| 7,316,617 B2 * | 1/2008 | Suzuki | .................... | A63F 13/10 463/30 |
| 7,559,834 B1 * | 7/2009 | York | ....................... | A63F 13/10 463/2 |
| 7,594,847 B1 * | 9/2009 | York | ....................... | A63F 13/00 463/2 |
| 7,677,977 B2 * | 3/2010 | Maehiro | ................. | A63F 13/00 273/317.1 |
| 7,766,746 B2 * | 8/2010 | Fujii | ....................... | A63F 13/10 463/31 |
| 7,789,741 B1 * | 9/2010 | Fields | .................... | A63F 13/10 463/2 |
| 8,016,671 B2 * | 9/2011 | Yamamoto | .............. | A63F 13/10 345/173 |
| 8,313,376 B2 * | 11/2012 | Asuke | ................... | A63F 13/525 463/36 |
| 8,491,394 B2 * | 7/2013 | Fields | .................... | A63F 13/10 463/42 |
| 8,500,552 B2 * | 8/2013 | Sawano | .................. | A63F 13/10 463/16 |
| 8,961,303 B2 * | 2/2015 | Sawano | .................. | A63F 13/10 463/16 |

OTHER PUBLICATIONS

Appli Style vol. 2 p. 26-p. 27 dated May 23, 2011.
Game "Depth Fantasia (Trademark)" official guide dated May 22, 2002.
FamiTsu dated Aug. 19, 2010.

* cited by examiner

Communication terminal 10

Game server 20

Progression of game area

| 1-1 | 1-2 | 1-3 | 1-4 | 1-5 | 1-6 | 1-7 |
|-----|-----|-----|-----|-----|-----|-----|
| 2-1 | 2-2 | 2-3 | 2-4 | 2-5 | 2-6 | 2-7 |
| 3-1 | 3-2 | 3-3 | 3-4 | 3-5 | 3-6 | 3-7 |
| 4-1 | 4-2 | 4-3 | 4-4 | 4-5 | 4-6 | 4-7 |
| 5-1 | 5-2 | 5-3 | 5-4 | 5-5 | 5-6 | 5-7 |
| 6-1 | 6-2 | 6-3 | 6-4 | 6-5 | 6-6 | 6-7 |
| 7-1 | 7-2 | 7-3 | 7-4 | 7-5 | 7-6 | 7-7 |

Map

FIG.9

| User ID | 000001 | |
|---|---|---|
| User name / display image | KNM | xxx.jpg |
| Strength point | 60 | |
| User ID of friends | 012345, ··· | |
| Image data of owned cards | Warrior cards | Image data |
| | PL001 | xxx.jpg |
| | PL081 | xxx.jpg |
| | ⋮ | ⋮ |

| Parameters of owned cards | Warrior cards | Parameter | | | |
|---|---|---|---|---|---|
| | | Attack power | Defence power | ··· | ··· |
| | PL001 | 300 | 450 | ⋮ | ⋮ |
| | PL081 | 900 | 250 | ⋮ | ⋮ |
| | ⋮ | ⋮ | ⋮ | ⋮ | ⋮ |

User database

FIG.11

| User ID | Access | Area | Time |
|---|---|---|---|
| 13840 | Access (Login) | — | 2012.1.24 10:08 |
| 16043 | Access | 3-4 | 2012.1.24 10:10 |
| 34001 | Access (Login) | — | 2012.1.24 10:12 |
| 13840 | Access | 4-1 | 2012.1.24 10:12 |
| 52098 | Access | 5-1 | 2012.1.24 10:15 |
| ⋮ | ⋮ | ⋮ | ⋮ |

Log Data

FIG.13

| Number of users accessing during a period of time | Visualized areas |
|---|---|
| 100 ~ 1000 |  |
| 1001 ~ 10000 |  |
| 10001 ~ |  |

| User ID : 13840 ||
|---|---|
| Access time | Operation contents |
| 2012.11.12 10:05 | Login |
| 2012.11.12 10:08 | Selection operation selecting area 4-2 |
| 2012.11.12 10:09 | Selection operation selecting button m10 ( "Search" ) |
| ⋮ | ⋮ |

Log data

FIG.20

GAME CONTROL DEVICE, GAME CONTROL METHOD, A NON-TRANSITORY COMPUTER-READABLE RECORDING MEDIUM, AND GAME SYSTEM

CROSS-REFERENCE TO RELATED APPLICATION

The present invention is based upon and claims the benefit of priority of Japanese Patent Application No. 2012-011571, filed on Jan. 23, 2012, and Japanese Patent Application No. 2012-257263, filed on Nov. 26, 2012, the entire contents of Japanese Patent Application No. 2012-011571 and Japanese Patent Application No. 2012-257263 being incorporated herein by reference.

FIELD

The present invention relates to a technique for controlling a progress of a game for respective users.

BACKGROUND

Recently, so-called social network games have become widespread which run on game applications created on the basis of operating environments such as application programming interfaces (API) operated on a web browser in a social networking service (SNS) provided by a particular service provider. Social network games may be defined as a type of online game played between a plurality of unspecified users who are communicating with each other. A player who has a communication terminal connectable to the Internet and with a web browser installed is able to enjoy network games regardless of the time or location.

One characteristic of the abovementioned social network game is that communication functions for socializing between players are more sophisticated than those of conventional online games. For example, in social network games, besides collaborative play with other players (friends), players exchange information through communication with friends such as greetings and contacts, and give or exchange items in the game with friends. In the digital card game (Dragon collection (registered trademark)) disclosed in a Japanese game magazine (Appli Style, Vol. 2, Eastpress Co., Ltd., p. 26-27), items are distributed to respective users based on a number of login users.

SUMMARY OF THE INVENTION

In the game described in the Japanese game magazine described above, items are distributed based on a number of login users so that respective users receive benefits; however, the respective users cannot realize overall excitement of the game in a status in which many users login to the game.

The present invention has been devised in consideration of the above. An object of the present invention is to provide a game control device, a game control method, a program, a recording medium, and a game system that can allow respective users to have a feeling of reality with regard to a number of users who login to the game at the same time.

An aspect of the present invention is a game control device including: an acquirer configured to acquire user access information for a user to a game; a calculator configured to calculate a number of users accessing to the game during a period of time or a number of users accessing to the game at a greater frequency than a given value, based on the user access information acquired by the acquirer; and a display controller configured to display a larger region in a game image visible by a game-playing user, as the number of users calculated by the calculator increases.

This game control device may further include an associator configured to associate the user with at least one of a plurality of areas set in the game, based on the user access information to the game, wherein the calculator calculates for every area the number of users associated by the associator, and the display controller sets the region visible to the game-playing user among the plurality of areas based on the number of users calculated for every area.

This game control device may further include a registrar configured to correlate users and register the correlation of the users, wherein the calculator calculates the number of users, the users being correlated with the game-playing user and accessing during the period of time.

In this game control device, the calculator may calculate the number of users after an operational input of the game-playing user in the game is recognized.

In this game control device, the user access information to the game may include an operation content of a user when the user accesses to the game, and the calculator may calculate the number of users executing an operation of an identical operation content to the game-playing user when the users access to the game during the period of time.

In this game control device, the calculator may periodically calculate the number of users accessing to the game, based on the user access information acquired by the acquirer, and the display controller may display the region in the game image visible by the game-playing user based on the latest number of users calculated by the calculator.

BRIEF DESCRIPTION OF THE DRAWING

FIG. 9 illustrates an example of map configuration in the game according to the first embodiment;

FIG. 11 illustrates an example of a configuration of a user database included in the database server;

FIG. 13 illustrates an example of a configuration of log data;

FIG. 20 illustrates a modified example of a configuration of log data.

DETAILED DESCRIPTION OF THE EMBODIMENTS

Embodiments of a game system according to the present invention will be described below.

<First Embodiment>

(1) Configuration of Game System

Figure 1:
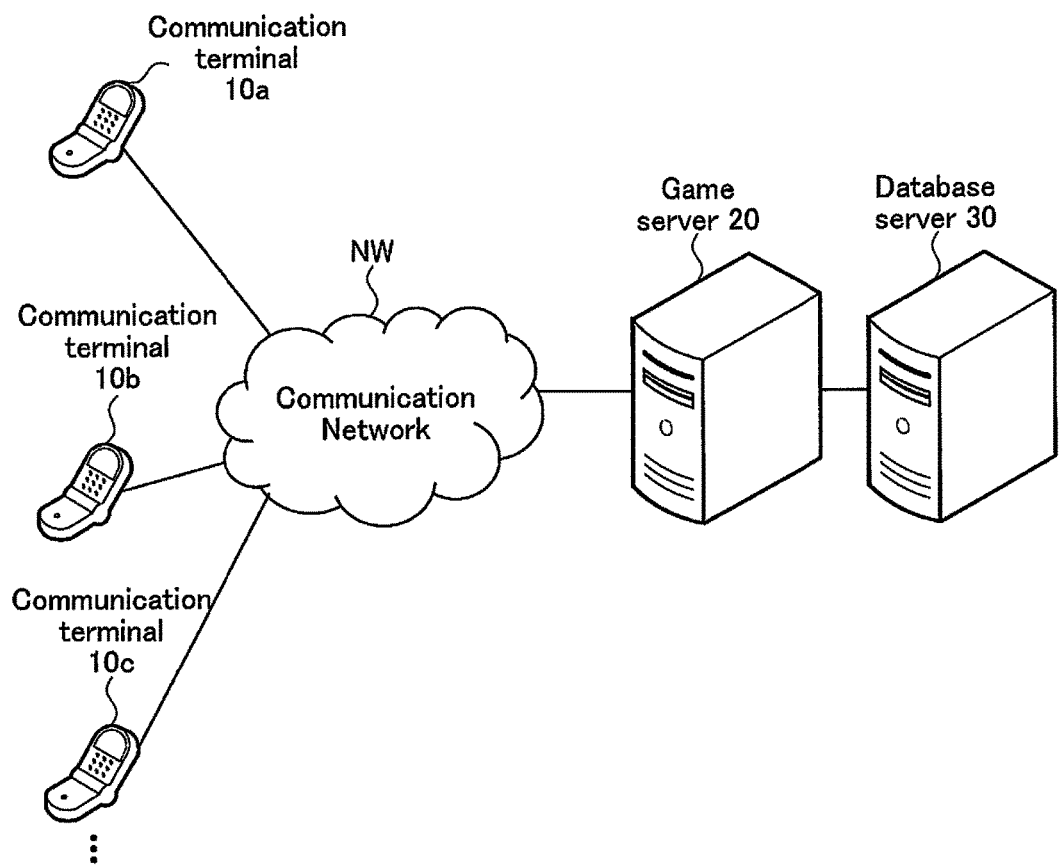
FIG. 1 illustrates a basic configuration diagram of a game system according to a first embodiment.

FIG. 1 illustrates an exemplary system configuration of a game system according to embodiments. As illustrated in FIG. 1, the game system includes a plurality of communication terminals 10a, 10b, 10c and etc. that are connectable to a communication network NW such as the Internet, a game server 20 that is connectable to the communication network NW, and a database server 30. Each of the communication terminals 10a, 10b, 10c and etc. is a communication terminal operated by individual users, such as a mobile terminal, a smartphone, a personal digital assistant (PDA), a personal computer, or a television receiver including a two-way communication function (including a so-called multi-functional smart TV), and the like. It should be noted that the communication terminals 10a, 10b, 10c and etc. may be hereinafter collectively referred to as "communication terminal(s) 10."

With this game system, the game server 20 is configured to be able to communicate with the communication terminal 10 as a client. The game server 20 provides gaming service with the communication terminal 10. The game server 20 is embedded with an application operable on a web browser as a game application in the game system. The database server 30 stores a variety of information for executing the games as described below. The database server 30 is connected to the game servers 20 by means of a wired connection for example for reading and writing the information.

The communication terminal 10 includes a web browser that is able to display a web page provided by the game server 20. A user plays a game by performing an operation on the web page displayed on the communication terminal 10.

In addition to the game server 20, an authentication server may be provided for authenticating respective users of the communication terminals 10, although not illustrated in FIG. 1. Further, if providing a plurality of the game servers 20 for receiving accesses from a large number of the communication terminals 10, a load balancer may be provided for regulating loads among the plurality of game servers 20. Furthermore, the game server 20 may be configured as a single server device or as a plurality of server devices to which functions are distributed.

(2) Communication Terminal Configuration

The communication terminal 10 will be hereinafter explained with reference to FIGS. 2A, 2B, and 3.

Figure 2A:
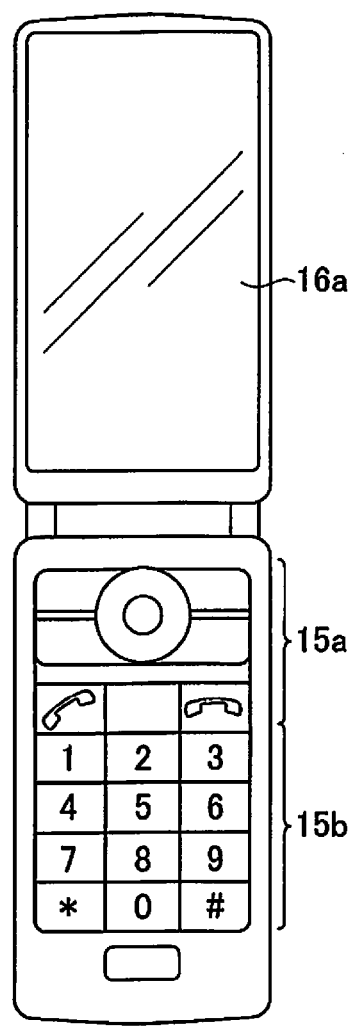
FIG. 2A illustrates an external appearance example of a communication terminal according to the first embodiment.
Figure 2B:
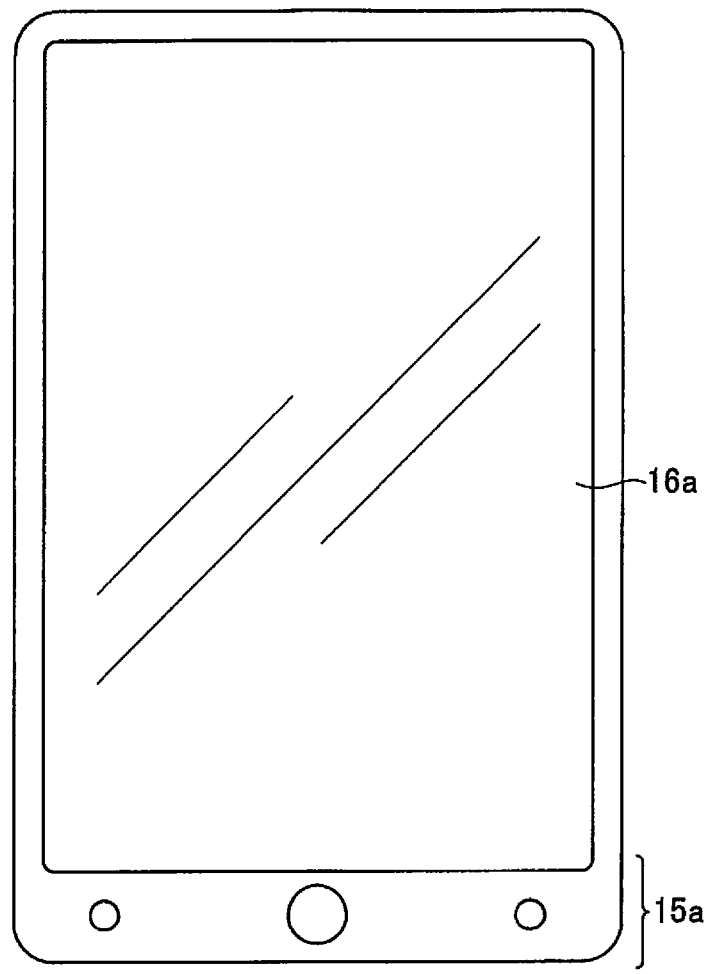
FIG. 2B illustrates an external appearance example of a communication terminal according to the first embodiment.

FIGS. 2A and 2B illustrate exemplary appearances of the communication terminal 10. FIG. 2A illustrates a communication terminal with a button input system such as, for example, a foldable communication terminal (mobile telephone) and the like. FIG. 2B illustrates a communication terminal with a touch panel input system such as, for example, a smartphone. FIG. 3 is a configuration block diagram of the communication terminal 10.

Figure 3:
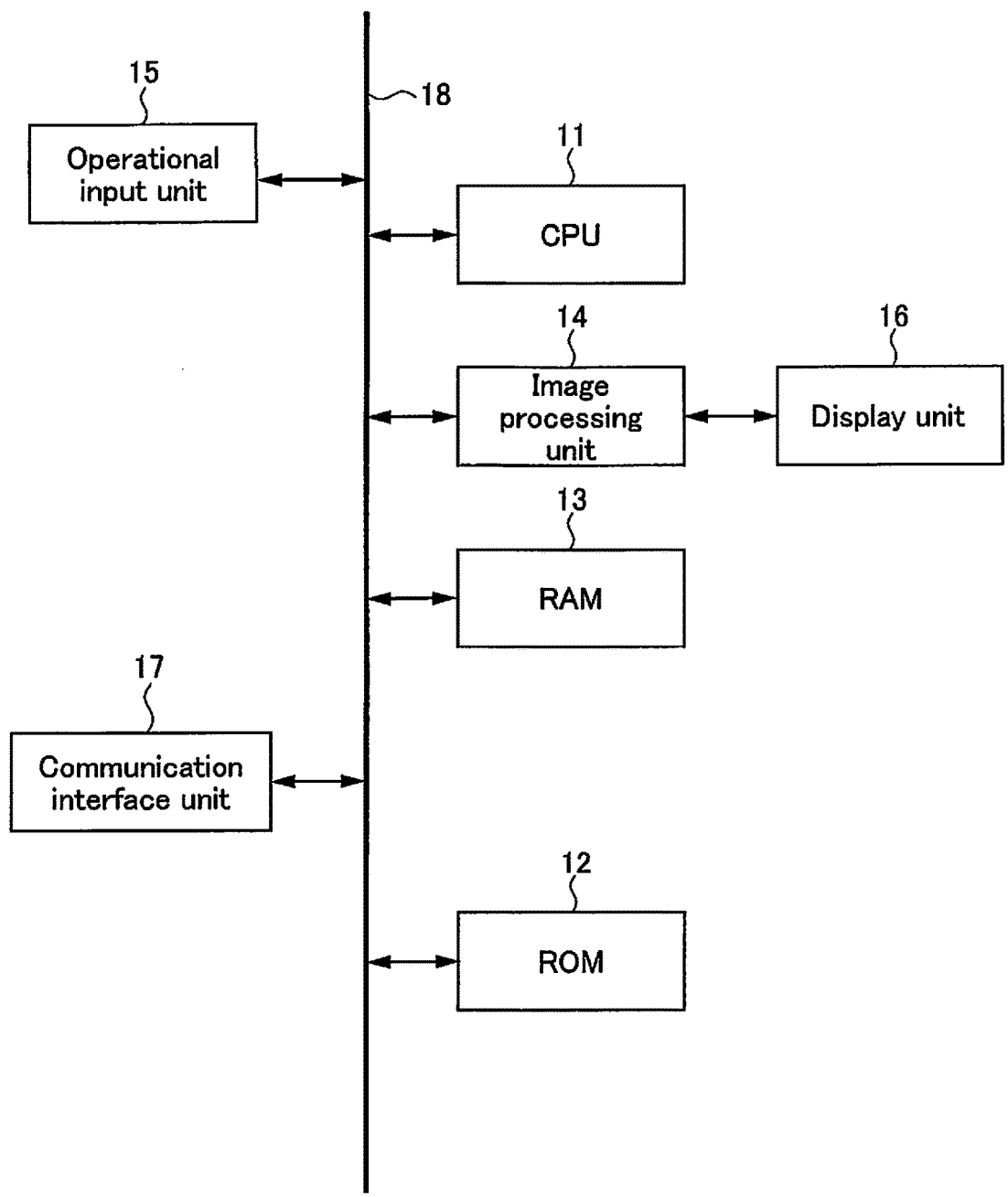
FIG. 3 is a block diagram of a configuration of a communication terminal according to the first embodiment.

As represented in FIG. 3, each communication terminal 10 includes a central processing unit (CPU) 11, a read-only memory (ROM) 12, a random access memory (RAM) 13, an image processing unit 14, an operational input unit 15, a display unit 16, and a communication interface unit 17 as a signal reception unit. Further, each communication terminal 10 includes a bus 18 for transmitting control signals or data signals among the components.

The CPU 11 loads a web browser stored in the ROM 12 into the RAM 13 and runs the web browser therein. The CPU 11 acquires data for displaying a web page from the game server 20 through the communication interface unit 17 on the basis of an appropriately specified uniform resource locator (URL) that is inputted by a user using the operational input unit 15 and the like. The acquired data is data of objects such as images associated with a hypertext markup language (HTML) document and the HTML document (hereinafter collectively referred to as "HTML data" on an as-needed basis). The CPU 11 then interprets the acquired HTML data. It should be noted that each communication terminal 10 may be embedded with a variety of plug-ins for extending browsing functions of the web browser.

In acquiring the HTML data, the CPU 11 transmits an access request message to the game server 20 through the communication interface unit 17. The access request message herein includes either a preliminarily registered user ID (user identification information) or a user ID inputted through the operational input unit 15.

The web browser displays on the display unit 16 a web page provided by the game server 20 through the image processing unit 14 on the basis of the acquired HTML data. Further, when either a Hyperlink or a menu on the web page is selected by a user operating the operational input unit 15, the web browser sends a request to the game server 20 (that is, a request for updating a web page; HTTP request) to transmit new HTML data for displaying the web page in accordance with the selection.

The image processing unit 14 displays a web page on the display unit 16 on the basis of image data for display to be provided from the CPU 11 as an analysis result of the HTML data. For example, the display unit 16 is a liquid crystal display (LCD) monitor including thin-film transistors arranged in a matrix manner on a pixel-by-pixel basis. The display unit 16 displays the image of the web page by driving the thin-film transistors on the basis of the image data for display on a display screen 16a.

In the case in which the mobile terminal 10 is a communication terminal to which a button input method (see FIG. 2A) applies, the operational input unit 15 is equipped with a button group 15a and a button group 15b. The button group 15a includes a plurality of operational input buttons such as a directional instruction button and a confirmation button for receiving user operational inputs. The button group 15b includes a plurality of operational input buttons such as an alphanumeric keypad and the like. The operational input unit 15 also includes an interface circuit for recognizing pressing (operational) inputs of the buttons and outputting the inputs to the CPU 11. For example, the direction instructional button is provided for instructing the CPU 11 to scroll and display a web page displayed on the display unit 16. The confirmation button is provided for instructing the CPU 11 to select one of a plurality of hyperlinks or menus displayed on a web page. The selected hyperlink menu may be activated (e.g., highlighted) when, for example, a plurality of hyperlinks or menus are displayed on the web page. When the communication terminal 10 is a small portable terminal, the aforementioned buttons are preferably disposed on the front face of the communication terminal 10 to allow a user to easily operate (click) the buttons with the thumb of the hand holding the communication terminal 10. In the example illustrated in FIG. 2A, the button group 15b is arranged below the button group 15a and includes a plurality of operational input buttons depicted as "0" to "9", "*", "#" (an alphanumeric keypad).

In the case in which the mobile terminal 10 is a communication terminal to which a touch panel input method (see FIG. 2B) applies, the operational input unit 15 receives touch panel method inputs inputted by mainly touching the display screen 16a with a finger or a pen. The touch panel input method may be a known method such as a capacitance method. As illustrated in FIG. 2B, the communication terminal 10 may be provided with a button group 15a despite having the touch panel input method.

In the case in which a button input method applies to the mobile terminal 10 for example, a selection operation of a menu on a web page displayed on the communication terminal 10 is performed by the following steps: selecting a menu with a pressing operation of the direction instructional button and subsequently confirming the selected menu with a pressing operation of the confirmation button. In the case in which a touch panel input method applies to the mobile terminal 10 for example, the selection operation is conducted by indicating (touch operation) with a finger or pen a position of a menu on the display screen 16a on which the web page is displayed.

(3) Game Server Configuration

Figure 4:
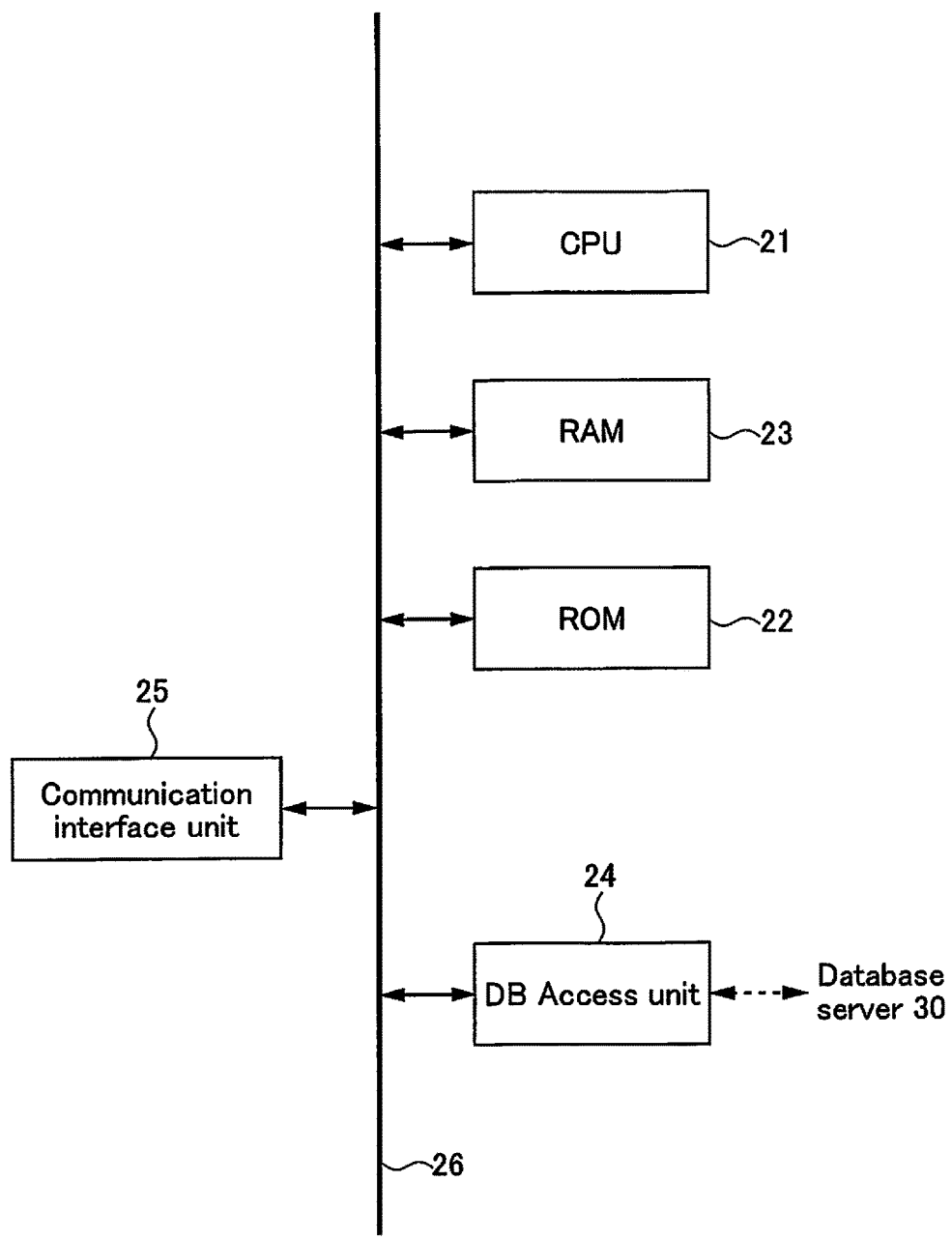
FIG. 4 is a block diagram of a configuration of a game server according to the first embodiment.

The structure of the game server 20 will be explained with reference to FIG. 4. For example, the game server 20 manages a website of a game including a plurality of hierarchically structured web pages. The game server 20 provides a web service of the game to the communication terminals 10. As illustrated in FIG. 4, the game server 20 includes a CPU 21, a ROM 22, a RAM 23, a database (DB) access unit 24, and a communication interface unit 25. Further, the game server 20 includes a bus 26 for transmitting control signals or data signals among the components. It should be noted that the game server 20 may have the same hardware structure as general-purpose web servers.

The ROM 22 stores an application program that provides the service of displaying a HTML document and objects such as images (i.e., displaying a web page) to the web browser of the communication terminal 10 as a client. A variety of data referenceable by the CPU 21 is stored in the ROM 22 in addition to the application program.

The CPU 21 loads a game program stored in the ROM 22 into the RAM 23 and runs the loaded game program. The CPU 21 also performs a variety of processing through the communication interface unit 25.

For example, the CPU 21 transmits HTML data to the communication terminal 10 through the communication interface unit 25. Moreover, the CPU 21 performs authentication processing when the game server 20 performs authentication processing of the user of the communication terminal 10.

The CPU 21 performs processing in accordance with the hyperlink or menu selected by the user on the web page displayed on the communication terminal 10 through the communication interface unit 25. The processing includes, for example, transmitting new HTML data, calculating or data processing in the game server 20.

The database access unit 24 is an interface used when the CPU 21 performs data reading and data writing with respect to the database server 30.

(4) An Example of a Game According to the Present Embodiment

Figure 5:
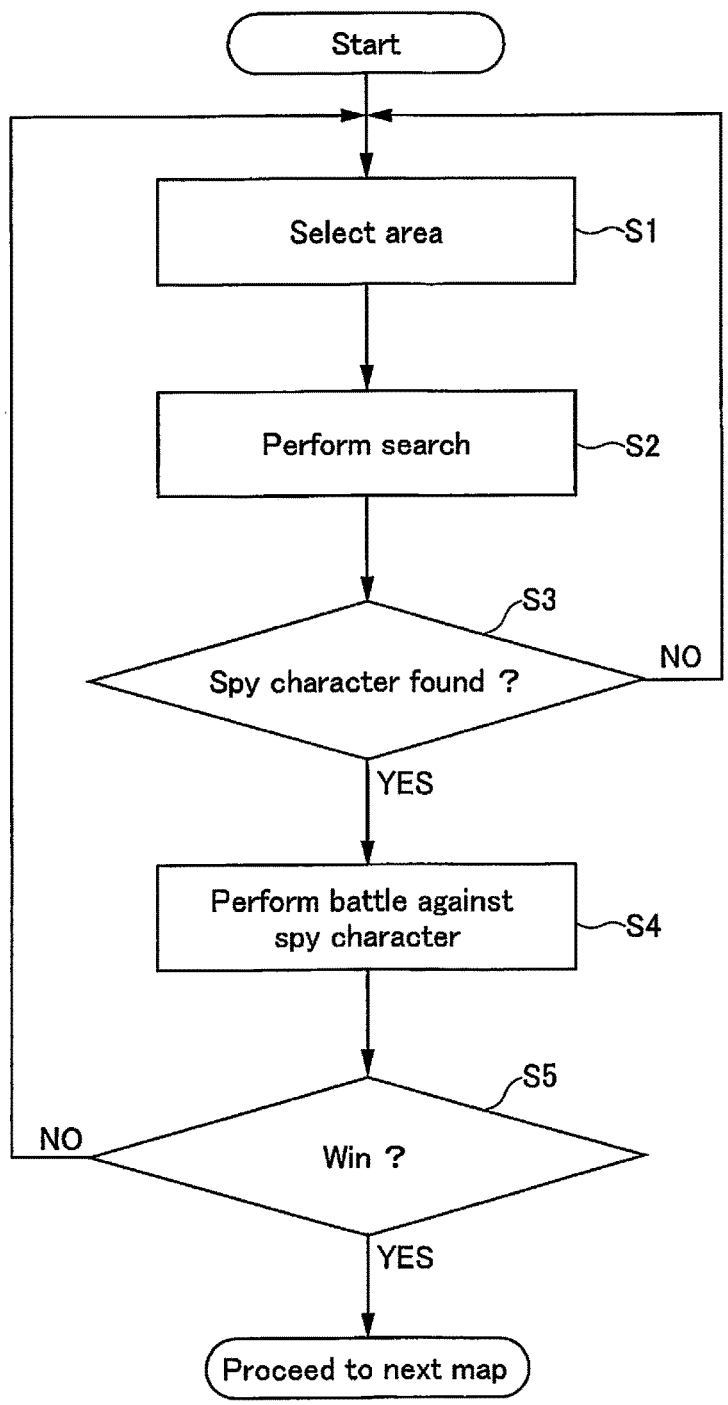
FIG. 5 is a flowchart generally illustrating a flow of the game described in the first embodiment.
Figure 6:
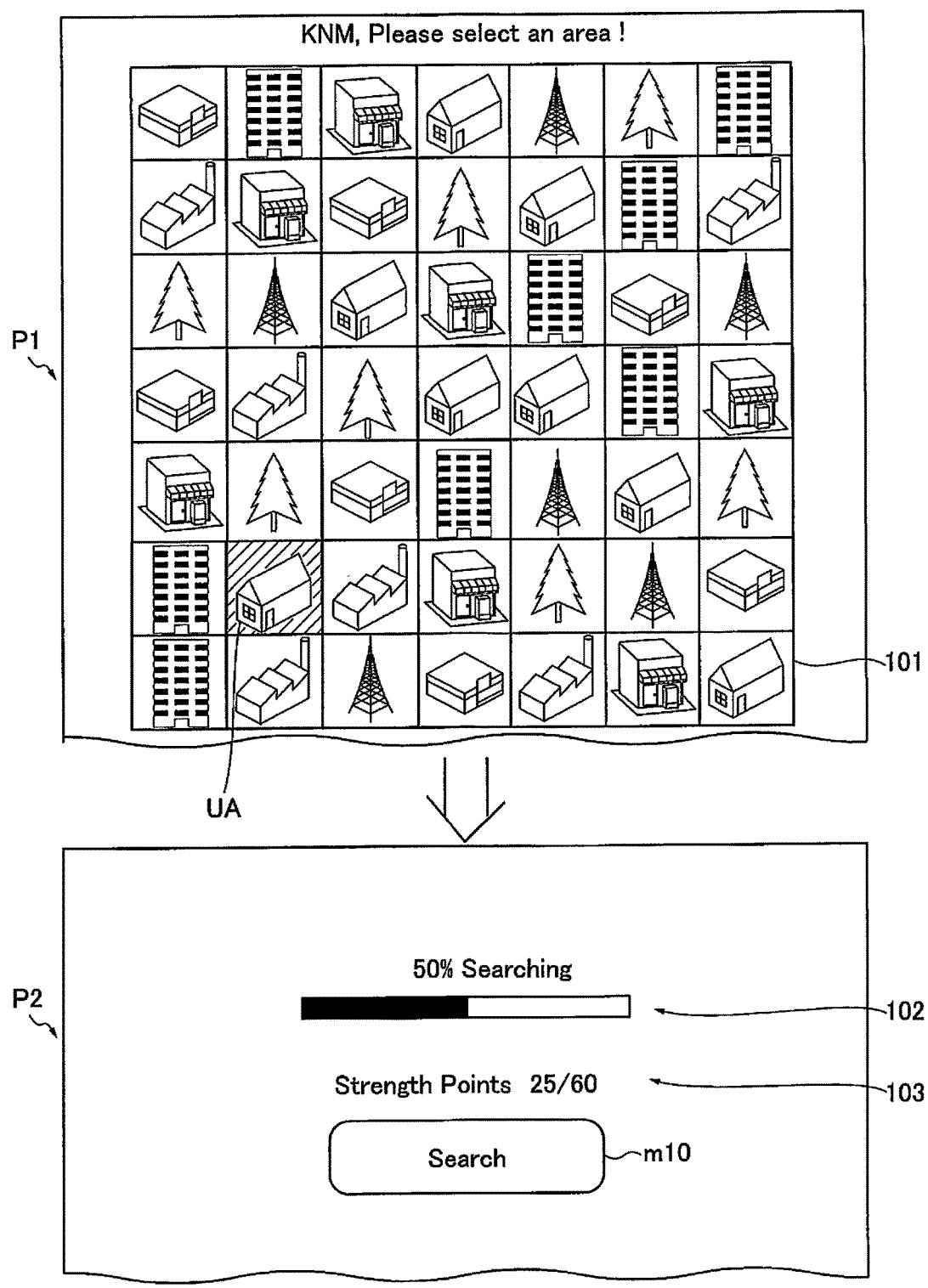
FIG. 6 illustrates an example of a web page displayed on the communication terminal of the user when executing the game according to the first embodiment.
Figure 7:
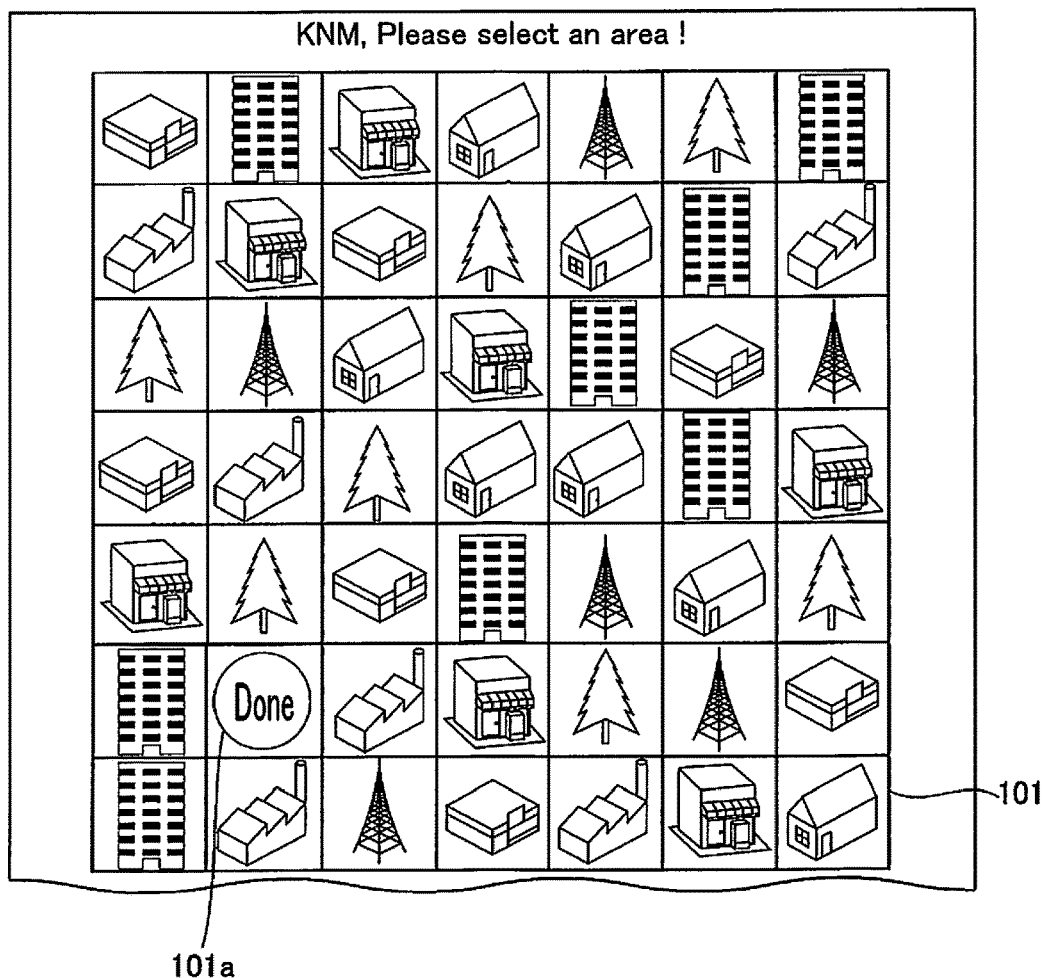
FIG. 7 illustrates an example of a web page displayed on the communication terminal of the user when executing the game according to the first embodiment.
Figure 8:
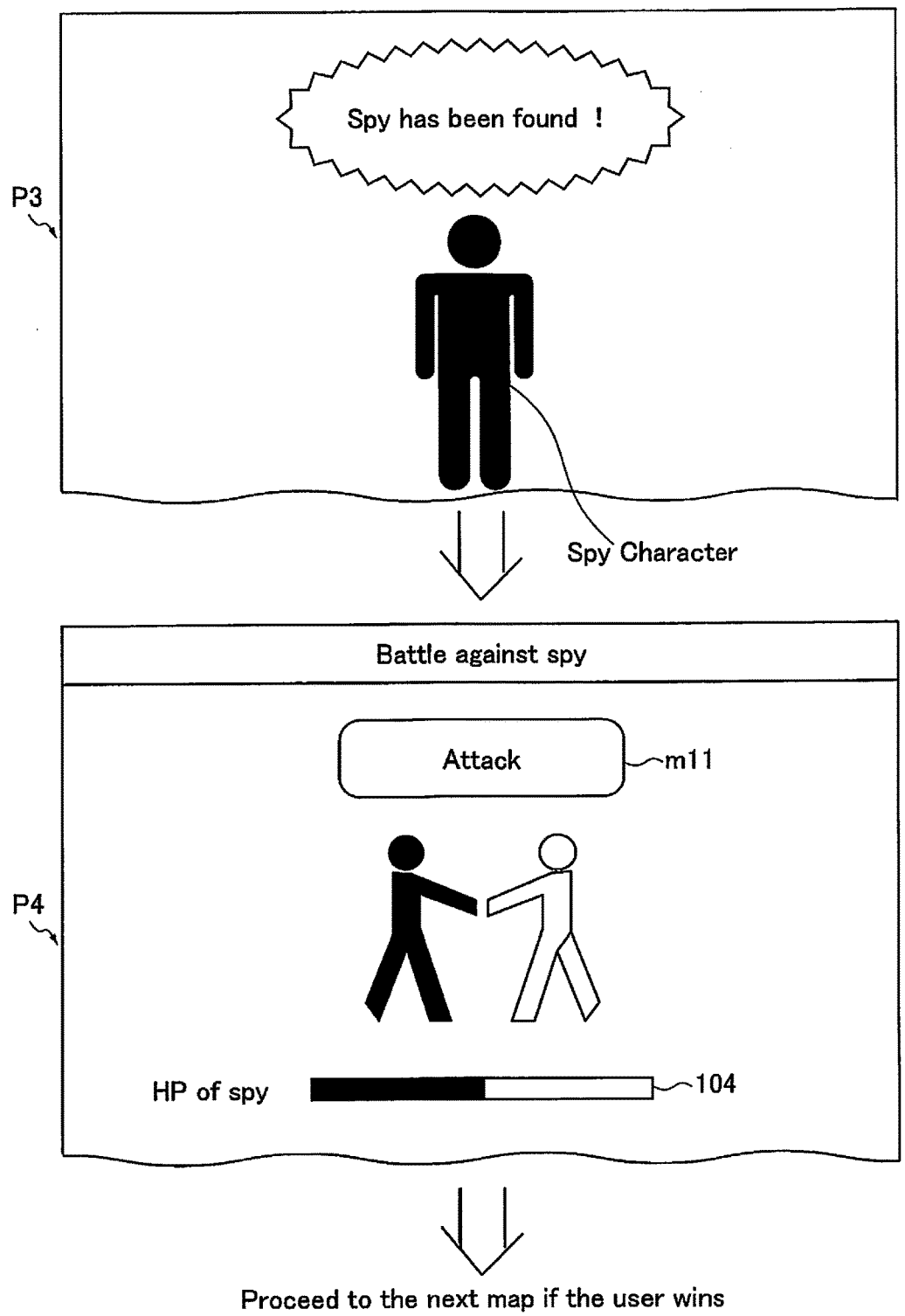
FIG. 8 illustrates an example of a web page displayed on the communication terminal of the user when executing the game according to the first embodiment.

A type of a game according the present embodiment is not limited to a specific type; however, an example of a game according the present embodiment realized by the game server 20 will be explained hereinafter with reference to FIGS. 5 to 8. FIG. 5 is a flowchart generally illustrating a flow of the game described in the present embodiment. FIGS. 6 to 8 each illustrates an example of a web page displayed on the communication terminal 10 of the user when executing the game according to the first embodiment.

In this game, a user is supposed to find out a spy character from a given map and conquer the map by defeating the spy character by use of user's warrior cards. More specifically, the game is as follows.

As illustrated in P1 of FIG. 6, a map 101 is displayed which is comprised of a given number of squares (hereinafter referred to as "areas") in a web page indicating a game image. It should be noted that, in the following explanation, when referred to "area", it means each minimum rectangular region illustrated in the web page P1 of FIG. 6. For example, the map 101 is comprised of 7×7 areas in the web page P1 of FIG. 6. In this game, a spy character is hidden in any one of areas in the map 101. A user is supposed to search for the spy character, and conquer the map 101 by winning a battle with the spy character. First, when any one of areas in the map 101 is selected by the user (Step S1), the web page is updated to display P2 of FIG. 6 for executing a search. When the user selects the menu m10 in the web page P2, a search is performed with a certain amount of the user's strength points consumed. A value indicated by the gauge increases as the user selects the menu m10. If the value reaches 100%, the search terminates. If the user cannot find out the spy character in the area that is searched, a newly selection of area is performed after returning to Step S1. In this case, as illustrated in FIG. 7, a sign 101a (a text of "Done" in FIG. 7 for example) is displayed on the area in which a search terminates, and the user cannot select that area again. Steps S1 to S3 are repeated until the spy character is found out. When the spy character is found out in any area (Step S3: YES), a battle is performed between the user who uses warrior cards and the spy character (Step S4). At this time, web pages P3 and P4 illustrated in FIG. 8 are displayed in order. If the user cannot win the battle with the spy character (Step S5: NO), the spy character escapes to any unsearched area to hide in. A newly selection of area is then performed after returning to Step S1. If the user wins the battle with the spy character (Step S5: YES), the map 101 is conquered and the user proceeds to the next map. That is, the user proceeds the game by conquering a plurality of maps in order.

Note that each area of the map 101 is defined as illustrated in FIG. 9 for convenience sake of the following explanation. Namely, the map 101 is comprised of 7×7 areas having areas 1-1 to 7-7. A shape of the map is not limited to rectangular and the shape may be arbitrarily formed. Arrangement of areas is not limited to placement of the areas in a matrix. Such arrangement may be arbitral placement of areas depending on the shape of the map.

(5) Database Server Configuration

The database server 30 can be realized by a general-purpose storage such as a high-capacity hard disc drive, a redundant array of inexpensive disks (RAID) or other form of device. Databases inside the database server 30 are configured to allow reading and writing of data by the CPU 21 through the database access unit 24 of the game server 20.

Figure 10:
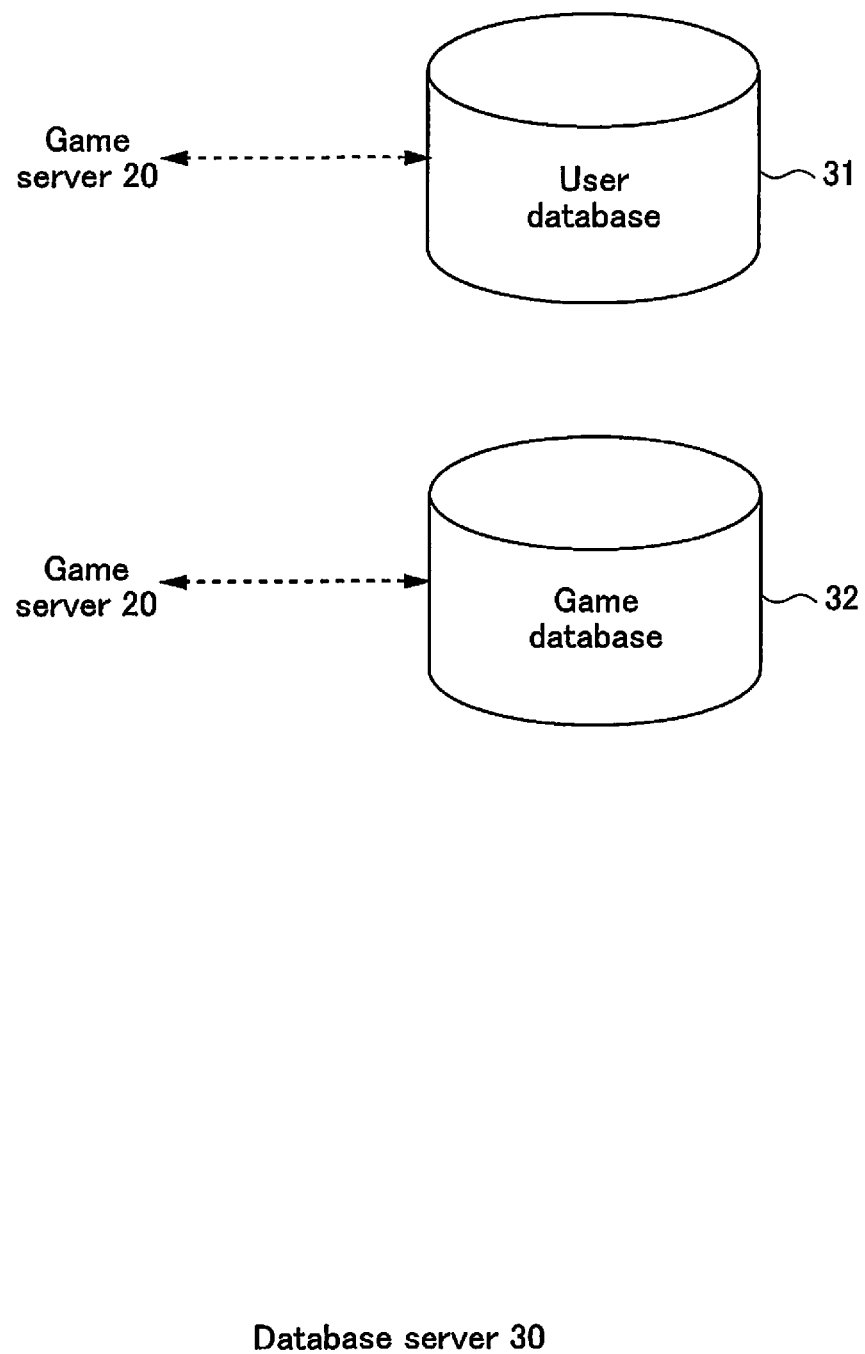
FIG. 10 is a block diagram of a configuration of a database server according to the first embodiment.

FIG. 10 illustrates an example of a database server 30 configuration. As illustrated in FIG. 10, the database server 30 includes a user database 31 and a game database 32.

FIG. 11 depicts an example of the user database 31 applied in the abovementioned game. In the example, the user database 31 includes, for each user ID (user identification information), information about a user name/display image, strength points, user IDs of friends, image data of owned cards, and parameters of the owned cards. The information included in the user database 31 may be updated by the game server 20.

In the following explanation, data for each user ID or for each user name (explained below) that identifies a user included in the user database 31 is referred to collectively as "user data." The data of the fields that configure the user data are described below.

User Name/Display Image

The "user name/display image" field represents a user name and a display image displayed for identifying the user of the communication terminal 10 while executing the game. The user name may be a text of a certain length or less specified in advance by the user. The display image may be, for example, an avatar image selected in advance by the user. The user name is a name to identify a user in a network environment (or a game community) provided by the game server 20.

Strength Points

Strength points are points that are required for proceeding the game for the user. The strength point is a value that decreases while executing a search and recovers (increases) each time a certain period of time elapses.

User ID of Friends

"User ID of friends" represents data of other user IDs that are friends of the applicable user ID.

Image Data of Owned Cards

"Image data of owned cards" represents data including image of the warrior cards that the user owns in the game.

Parameters of the Owned Cards

"Image data of owned cards" represents data of capability of the warrior cards that the user owns. For example, as illustrated in FIG. 11, the parameter may include each capability value of "Attack power" and "Defense power."

The game database 32 stores and updates information related to progress of the game executed by the game server 20 on the basis of accesses from the game server 20. The information related to progress of the game may include various types of information according to the character of the game. In the exemplary game of the present embodiment, the information related to progress of the game includes information indicating search status for the map 101, information about maps that respective users has conquered or are trying to conquer, and the like.

(6) Overview of Functions of Game Control Device

Figure 12:
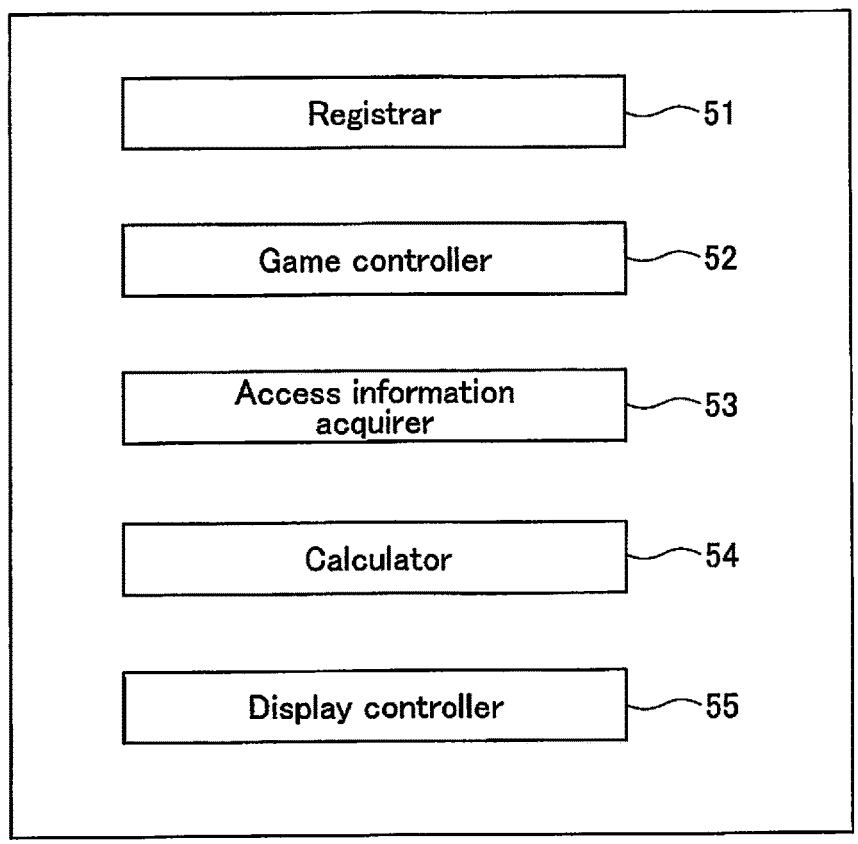
FIG. 12 is a functional block diagram for explaining functions playing main rolls in the game control device according to the first embodiment.

In the present embodiment, the game control device is configured, for example, by the game server 20 and the database server 30. Hereinafter, functions performed by the game control device of the present embodiment will be described with reference to FIG. 12 as an example applicable to the abovementioned game. FIG. 12 is a functional block diagram for explaining functions playing main rolls in the game control device according to the present embodiment.

In the following explanation, marks and menus and the like displayed on the web pages displayed on the communication terminal 10 are arranged in preferable positions on the web pages. The positions on the display screen of the menus and marks and the like made visible by the communication terminal 10 may be changed with a scrolling operation of the web page by the user using a direction instructional menu or touch panel operation.

A registrar 51 is configured to recognize a user request and execute registration processing. Such request is based on a suitable operational input to the communication terminal 10 on a web page provided to the communication terminal 10, for example. The function of the registrar 51 is realized, for example, as described below. The CPU 21 of the game server 20 receives a registration request message from the communication terminal 10 through the communication interface unit 25. The web page provided by the game server 20 may be configured so that a registration request message is automatically created by a certain operation (e.g., a selection of a certain button, or a text input and the like) to the communication terminal 10 on the web page. Information (e.g., an IP address or an email address and the like) for identifying the communication terminal 10 that is the transmission source may be included in the registration request message. Alternatively, in the case in which the user plays the other game(s) from the same service provider, the registration request message may include the user ID of that user. The registration request message may include a password specified by the user or individual identification information (serial number of the communication terminal, etc.). The password or the individual identification information is recorded in the game server 20 for authentication process when the respective users login.

The CPU 21 receives the registration request message. When a user ID is not included in the registration request message, the CPU 21 issues a new user ID and processes the new user ID, and then transmits a message to the communication terminal 10 indicating the fact that the registration processing has been completed. The CPU 21 receives the registration request message. When a user ID is included in the registration request message, the CPU 21 processes that user ID, and then transmits a registration completion message to the communication terminal 10. The registration completion message indicates that the registration processing has been completed.

When the registration is completed, the CPU 21 prepares user data corresponding to the user ID and stores the user data in the user database 31.

The registrar 51 may also register a user ID in association with the other user ID upon an application based on the user ID. That is, the registrar 51 registers the other user ID (namely, the other user) as a "friend" upon an application based on the user ID.

In this case, the registrar 51 is performed, for example, as described below. The CPU 21 of the game server 20 receives an application message (application) that specifies a user ID (or the corresponding user name) to desirably be friends with, from the communication terminal 10 of the user corresponding to a certain user ID through the communication interface unit 25. The transmission of the application message may be preset as a function of the web page provided to the communication terminal 10 of the user. Upon receiving the application message, the CPU 21 transmits HTML data to the communication terminal 10 corresponding to the user ID, when access occurs based on the user ID included in the application message. The transmitted HTML data is for displaying a web page to request for replying whether or not the application on the basis of the other user ID is approved. The CPU 21 registers both users as friends if a message of approval of the application is returned. Specifically, the CPU 21 writes the data in the "friend" field (see FIG. 11) of the user data of the two corresponding user IDs in the user database 31.

It should be noted that the registrar 51 may register users as friends without a procedure of application and approval of the application as described above. For example, the CPU 21 may receive an application message (application) that specifies a user ID (or the corresponding user name) to desirably be friends with. The CPU 21 then register the specified user ID as a friend without receiving approval of the user of the specified user ID.

A condition under which users are associated is not limited to that described above. Users are registered as friends when they play an identical stage or area of an identical game or when they play a match together. Alternatively, users who transmit greetings message at predetermined times may be automatically registered as friends. If there exist a mode in a game executing a battle, users executing the battle together or users executing the battle cooperatively against an opponent character may be automatically registered as friends.

In the present embodiment, an example is disclosed in which registration of users as friends is realized by writing data into the user database 31; however, registration of users as friends is not limited to such example. Data with regard to friends may be written to an external memory device in the network that is accessible from the game server 20.

The game controller 52 is configured to progress the game by transmitting HTML data for successively updating web pages displayed on the communication terminal 10 in response to operations by the user to the communication terminal 10. Processing performed by the game controller 52 includes search processing and battle processing, for example.

[Search Processing]

The game controller 52 is configured to perform search processing for searching for a spy character hidden in any area in the map 101. A method to realize the search processing will be explained hereinafter.

The web page P1 illustrated in FIG. 6 and displayed on the user's communication terminal 10 is configured to receive an operation selecting an area in the map 101. In the web page P1 of FIG. 6, an area selected by the user is denoted as user position UA. When recognizing the user position UA selected by the user, the CPU 21 transmits to the communication terminal 10 HTML data for displaying the web page P2 illustrated in FIG. 6. The web page P2 illustrated in FIG. 6 includes a search gauge 102, a text 103 for indicating strength points, and a button m10 on which a text "search" is denoted. Here, when the CPU 21 recognizes selecting the button m10, a value (%) indicated by the search gauge 102 increases by a randomly determined amount while a value indicating the strength points is decreased by a certain amount. The increased value indicated by the search gauge 102 is displayed. When the value (%) indicated by the search gauge 102 becomes 100%, then the search processing terminates.

The CPU 21 sets (locates) a spy character in an area in the map 101. If the CPU 21 judges that an area selected by the user coincides with an area in which the spy character has been set, the CPU 21 starts executing battle processing after the value (%) indicated by the search gauge 102 becomes 100%. Alternatively, the CPU 21 starts executing battle processing at any arbitral time before that value becomes 100%. That is, the CPU 21 transmits to the communication terminal 10 HTML data for displaying the web pages P3 and P4 illustrated in FIG. 8.

[Battle Processing]

The game controller 52 is configured to perform a battle in the game between a user by use of warrior cards and the spy character.

The battle against the spy character by use of the warrior cards owned by the user may be performed as described below. For example, the warrior cards which participate in the battle against the spy character are selected in advance among warrior cards owned by the user. Alternatively, the CPU 21 may select some warrior cards randomly among a plurality of warrior cards included in user data of user ID being processed.

When recognizing that the button m11 has been selected in the web page P4 illustrated in FIG. 8, the CPU 21 of the game server 20 initiates the battle processing. The battle processing may be performed with any arbitral method. The following method may be applied. A parameter (hit points HP) indicating strength has been set to a spy character. The HP of the spy character during the battle is displayed at the HP gauge 104 in the web page P4 of FIG. 8. The user may decrease the HP of the spy character by attacking with one or a plurality of warrior cards. The CPU 21 recognizes an instruction of attack of the user with a selection operation of the button m11 in the web page P4 of FIG. 8, and then decreases the HP of the spy character. A decreased amount of the HP of the spy character may be preferably determined in accordance with a parameter of attack power of the worrier cards participating in the battle. Alternatively decreased amount of the HP may be varied randomly.

For example, the CPU 21 determines a battle result with a given times operation for the button m11. The CPU 21 performs the game such that the spy character is not defeated if the HP of the spy character does not become zero with the given times operation for the button m11. The spy character then escapes to the other area (that is, the spy character is relocated). That is, the CPU 21 transmits to the communication terminal 10 HTML data for displaying the web page illustrated in FIG. 7. The CPU 21 then sets (locates) the spy character at an area other than areas that have been already searched (any area other than area 6-2 to which a sign 101a is indicated, in an example of FIG. 7). On the other hand, the CPU 21 executes the game such that the spy character is defeated and the map 101 is conquered accordingly if the HP of the spy character becomes zero with the given times operation for the button m11. In this case, the CPU 21 generates HTML data notifying that the spy character has been defeated, and then transmits the HTML data to the communication terminal 10.

The access information acquirer 53 is configured to acquire user access information from the communication terminal 10 of a user registered in the game server 20.

It should be noted that "access" may be login access by transmitting from the communication terminal 10 a password, individual identification information, or information required for authentication. "Access" may be access of transmission of HTTP request, for example) by transmitting information regarding operational inputs in the game to request update of a web page after login.

The function of the access information acquirer 53 may be realized as described below. The CPU 21 of the game server 20 records user access information in the database server 32 as log data, every time the CPU 21 recognizes access based on user ID. FIG. 13 illustrates an example of configuration of log data. As illustrated in FIG. 13, the log data is data indicating user ID, an area being accessed, and time information of access in order of time when access is recognized.

In the search processing described above, at a time when the CPU 21 recognizes that there has been an operation of the user to select any area in the map 101 of the web page P1 illustrated in FIG. 6, the CPU 21 records a specified area and an access time for the area, in association with user ID in the log data. Note that, in FIG. 13, access data for which any area is not written indicates login access.

The calculator 54 is configured to calculate a number of users accessing to the game during a period of time. Here, two methods may be applied to determine a beginning point of time for the predetermined period of time. One of the methods is a method to set a time when a game-playing user logs in as a reference time and to subsequently calculate a number of users accessing to the game during a period of time beginning from the reference time. Another method is a method to set a time when access occurs due to an operational input of the game-playing user as a reference time and to calculate a number of users accessing to the game during a period of time beginning from the reference time. With the latter method, the CPU 21 calculates a number of users every time access occurs, which results in a certain load. On the other hand, with the latter method, accuracy of the calculated number of users becomes high. That is, because a user does not necessarily access immediately after login of the user, accuracy of the calculated number of users becomes higher, compared to the case in which a login time is set to be a reference time.

The function of the calculator 54 may be realized as described below. The CPU 21 of the game server 20 accesses to the game database server 32 to refer to the log data and calculates a number of users accessing to the game during a period of time beginning from a login time of the user being processed (game-playing user). Alternatively, the CPU 21 accesses to the game database server 32 to refer to the log data every time access occurs from the user being processed, and then calculates a number of users accessing to the game during a period of time beginning from an access time of the user being processed.

The display controller 55 is configured to display a larger region in a game image visible by a game-playing user, as the user number calculated by the calculator 54 increases.

Figure 14A:
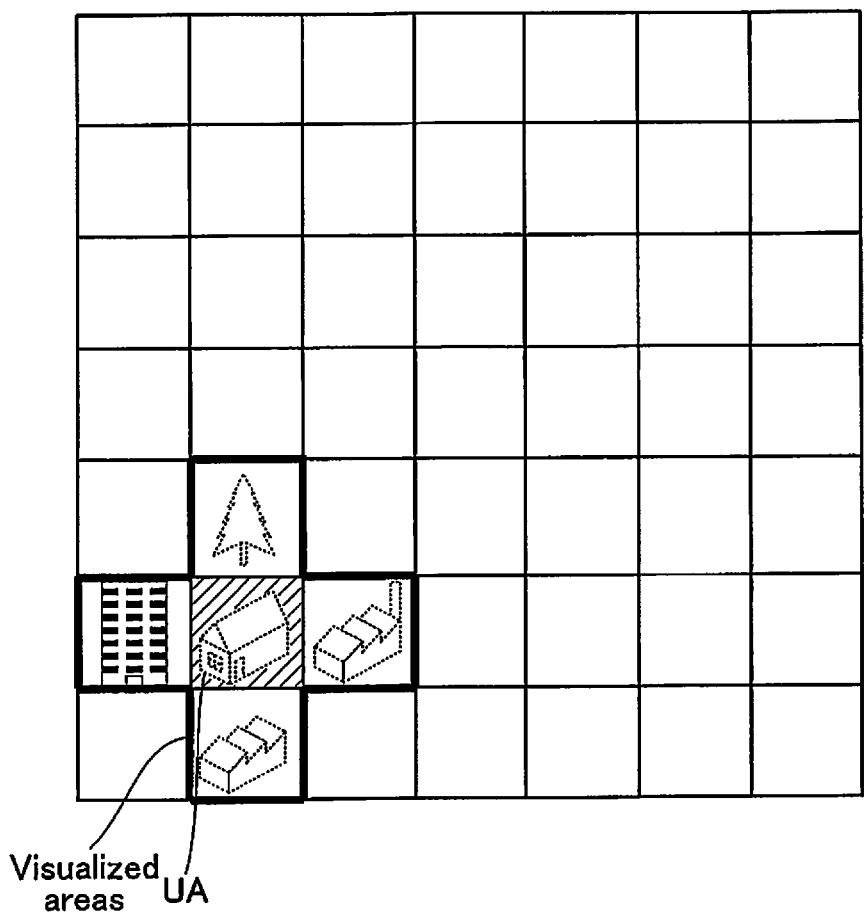
FIG. 14A illustrates an example of a web page displayed on the communication terminal of the user when executing the game according to the first embodiment.
Figure 14B:
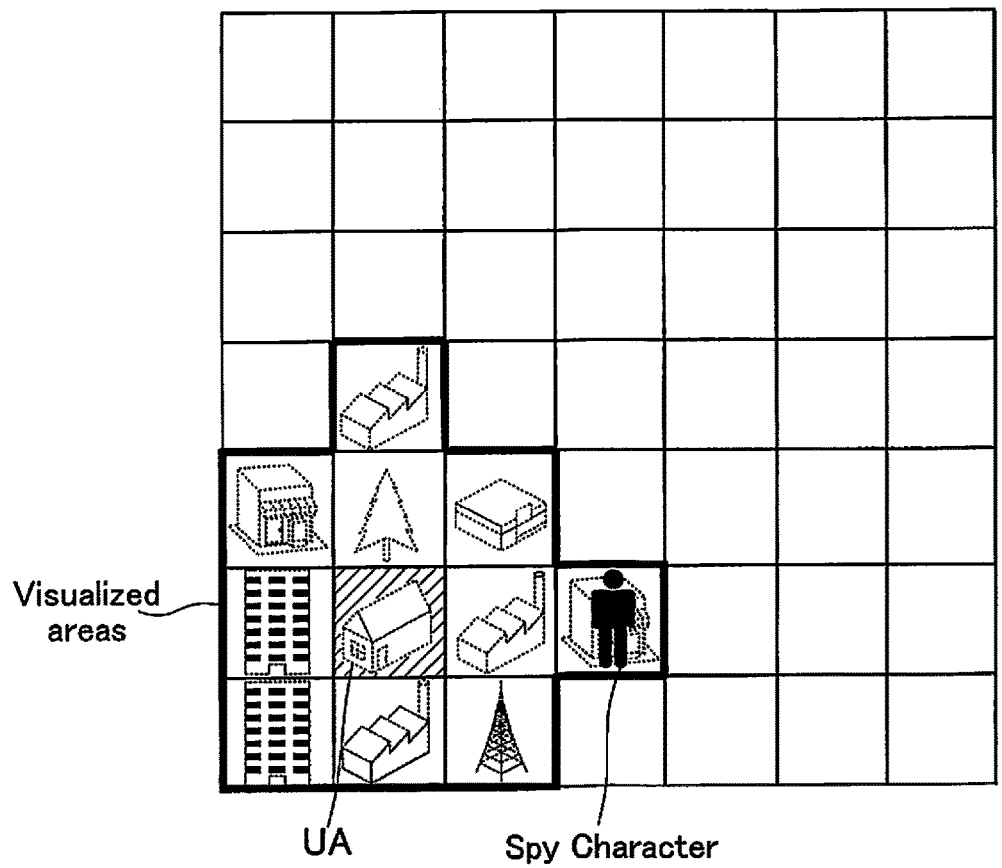
FIG. 14B illustrates an example of a web page displayed on the communication terminal of the user when executing the game according to the first embodiment.

Here, the contents of display control of the display controller 55 will be explained with reference to the contents of the game described above. According to the game of the present embodiment with reference to FIGS. 5 to 8, the following processing will be performed, if a spy character is not found after the search processing is performed upon user's selection for any user position UA in the map 101. That is, if the spy character is hidden in visualized areas corresponding to the number of users calculated by the calculator 54, a web page is displayed such that areas in which the spy character is hidden (located) are visible to the user. The visualized areas is a region comprised of one or a plurality of areas. Examples of displayed web pages are illustrated in FIGS. 14A and 14B in the case in which a spy character has not been found after the search processing is performed upon user's selection for a user position UA (area 6-2 in the web page P1 of FIG. 6). FIG. 14A represents an example of the visualized areas in a case in which the number of users calculated by the calculator 54 is relatively small. FIG. 14B represents an example of the visualized areas in a case in which the number of users calculated by the calculator 54 is relatively large. In this example, it is assumed that the spy character is hidden in the area 6-4. The spy character is not visible in the visualized areas of FIG. 14A, while the spy character is visible in the visualized areas, which are larger, of FIG. 14B. Therefore, a user watching the visualized areas of FIG. 14B can find out the spy character by selecting the area 6-4 in the subsequent area selection, and then perform a battle against the spy character.

Note that each web page of FIGS. 14A and 14B may be displayed upon user's selection operation for any area. That is, the visualized areas may be displayed without the search processing.

Figure 15:
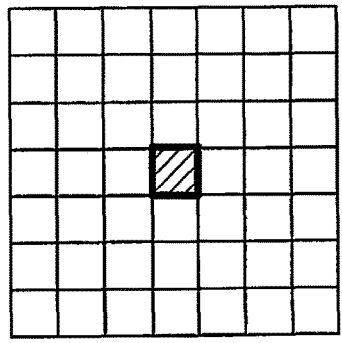
FIG. 15 illustrates correlation between a number of users accessing during a period of time and a visualized areas on the map.
Figure 15:
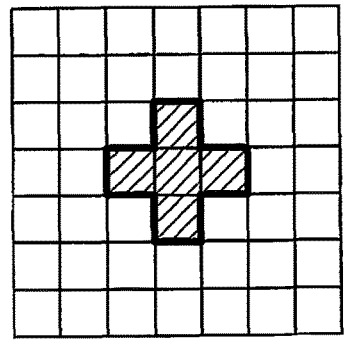
Figure 15:
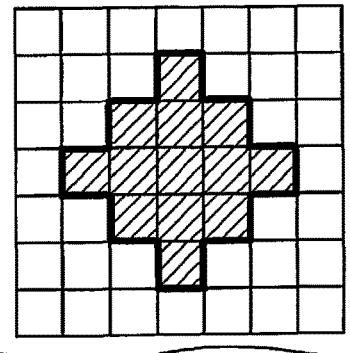

The function of the display controller 55 may be realized as described below. For example, the RAM 23 of the game server 20 memorizes data that correlates a number of users accessing to the game during a period of time beginning from the reference time, with visualized areas defined on the basis of user position UA (area selected by the user). FIG. 15 illustrates an example of such data. The data illustrated in FIG. 15 represents visualized areas corresponding to a number of users accessing to the game during a period of time with assumption that user position UA has been set to be an area 4-4, which is the center of the map 101. Referring to the data illustrated in FIG. 15, the CPU 21 determines visualized areas on the basis of user position UA that the user actually selects for search processing, and then generates HTML data for displaying a web page including the determined visualized areas. When the spy character is located in any area in the determined visualized areas, the spy character is displayed in any area in the map 101.

It should be noted that determination of the visualized areas corresponding to the number of users may not be limited to a method described with reference to FIG. 15. The visualized areas may be calculated using predetermined equation(s). For example, size of the visualized areas of a predetermined shape (rectangular, for example) or radius of circular visualized areas, or the like may be determined by multiplying the calculated number of users by a given fixed number.

Determination of the visualized areas is not limited to the size corresponding to the calculated number of users. Determination of the visualized areas may be executed based on the area accessed by the user during a period of time beginning from the reference time. In this case, the CPU 21 refers to the log data (see FIG. 13), and calculates a number of users accessing during the predetermined period of time for every area being accessed. The CPU 21 then determines the region of the visualized areas for the user playing the game such that visualized areas based on an area becomes larger as a number of access accessed by the user increases.

(7) Main Processing Flow of the Game Control Device of the Present Embodiment

Figure 16:
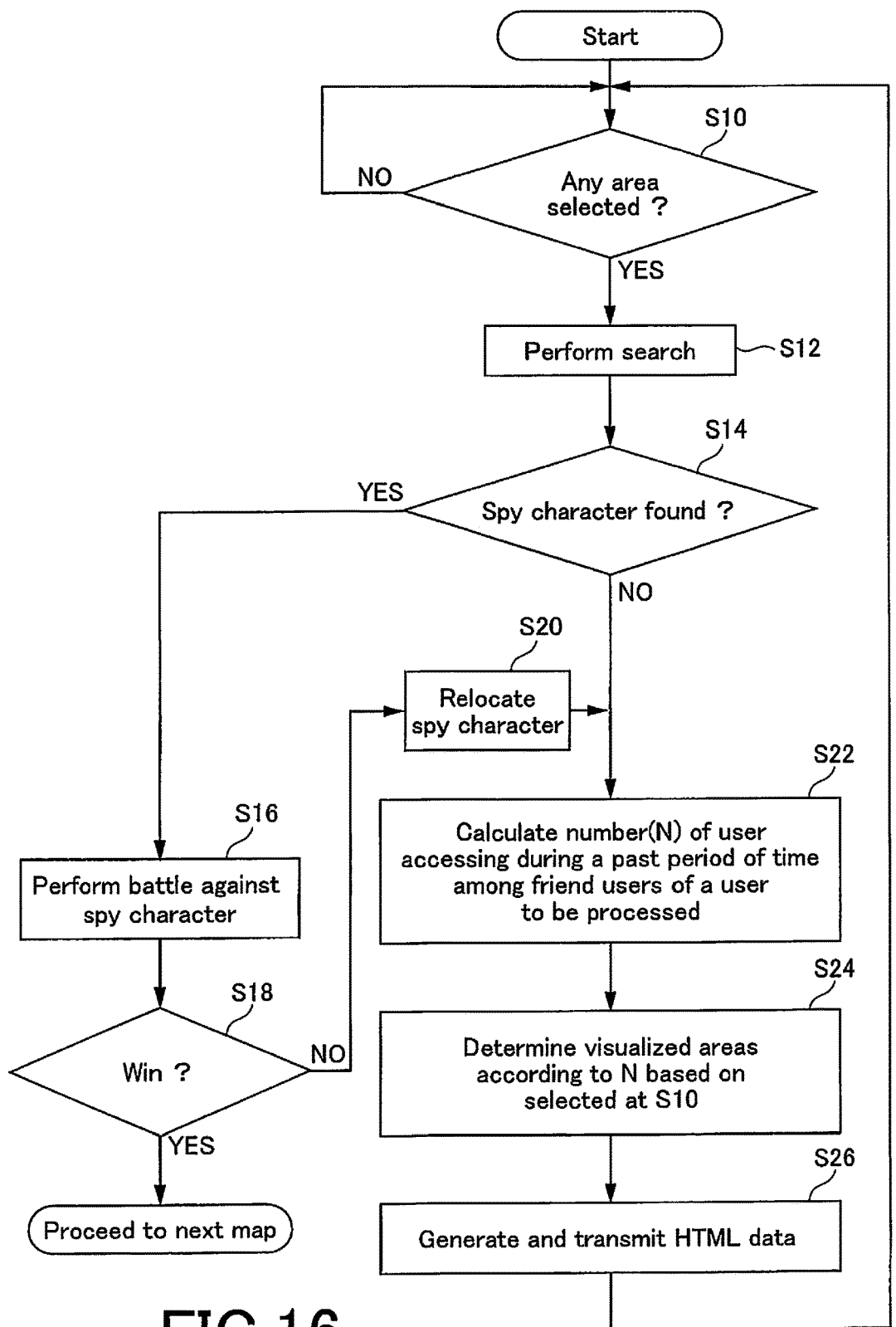
FIG. 16 is a flowchart illustrating an example of main processes of the game server according to the first embodiment.

The following is an explanation about an example of a main processing flow performed by the game server according to the present embodiment with reference to the flowchart in FIG. 16. FIG. 16 is a flowchart illustrating processing mainly performed by the game controller 52, the calculator 54, and the display controller 55.

As illustrated in the web page P1 of FIG. 6, initial image displayed in the communication terminal 10 of a user (game-playing user) includes the map 11 comprised of a predetermined number of areas. In this game, a spy character is hidden in an area of the map 101 which is predetermined by the game server 20. First, if any area is selected in the map 101 (Step S10: YES), the web page is updated to the web page P2 of FIG. 2 for executing a search. In the web page P2, in response to a user's operation to select the button m10, the game server 20 performs search processing with a certain amount of strength points consumed (Step S12). Every time the user's operation to select the button m10 occurs, a value indicated by the search gauge increases. When the value reaches 100%, the search terminates. Here, the game server 20 judges that the spy character has been found if an area in which the spy character is located coincides with the area selected by the user (Step S14: YES). The game server 20 then performs battle processing for a battle against the spy character by use of the warrior cards (Step S16). At this time, the game server 20 transmits to the communication terminal 10 HTML data for displaying the web pages P3 and P4 illustrated in FIG. 8 in this order. When the user defeats the spy character and wins the battle by use of the warrior cards upon the operation to select the button m11 (Step S18: YES), the map 101 has been conquered. Then, the user proceeds to the next map. If the user cannot win the battle against the spy character (Step S18: NO), the game server 20 again sets (that is, relocate) the spy character to any area other than the area selected at the Step S10 (Step S20). That is, the game is configured so that the spy character escapes to any other area.

When the spy character has not been found at Step S14, or when the user cannot win the battle against the spy character at Step S18, the game server 20 performs processing Steps S22 to S26 for displaying visualized areas.

That is, the game server 20 refers to log data, and then calculates a number (N) of users accessing during a period of time (Step S22). Next, the game server 20 refers to data illustrated in FIG. 15 and then determines a visualized areas corresponding to the calculated number of users (N) based on the area selected at Step S20 (user position UA)(Step S24). Next, the game server 20 generates HTML data for displaying the visualized areas, and transmits the HTML data to the communication terminal 10 of the user being processed. Here, when the spy character is hidden (located) in any area of the visualized areas, the game server 20 generates the HTML data such that the user can recognize (specify) the position of the spy character. Then, in response to a proper selection operation on the web page displaying the visualized areas, the web page is updated to one for the user to select any one area on the map 101, as illustrated in P1 of FIG. 6 for example.

As explained above, according to the game system of the present embodiment, as the greater number of users access to the game server during a period of time, a region of visualized areas in the game image becomes larger for the user. Thus, the user can have a feeling of reality with regard to the number of login users. The user can feel overall excitement of the game, and therefore feel a sense of unity with other users.

Note that, in the above-described embodiment, the calculator 54 calculates a number of users accessing during a period of time; however, the present invention is not limited to this case. The calculator 54 may have a function for calculating a number of users whose access frequency is greater than a given value. Here, "access frequency" indicates a number of times of occurrence of access from a user for a certain period of time.

In this case, in order to realize the function of the calculator 54, the CPU 21 of the game server 20 counts a number of times for which respective users access every certain period of time (twelve hours, for example). In this case, the counted value corresponds to access frequency. The CPU 21 calculates a number of users for which the count value is greater than a given value (five, for example) every certain period of time. Referring to known data indicating relation between a number of users and a region of visualized areas, the CPU 21 determines visualized areas corresponding to the calculated number of users, and then generates HTML data for displaying a web page including the visualized areas. The access frequency may be updated every certain period of time, and the region of the visualized areas is updated accordingly. When the visualized areas is determined based on the access frequency, the user can also visually feel overall excitement of the game.

<Second Embodiment>

According to the first embodiment, the visualized areas is set such that, as a greater number of users access to the game server during a period of time, the visualized areas on the basis of the user position (area selected by a game-playing user) becomes larger for the game-playing user; however, a method for setting the visualized areas is not limited to one described above. In the present embodiment, visualized areas is set based on a number of users accessing during a period of time for each area irrespective of the user position.

Figure 17A:
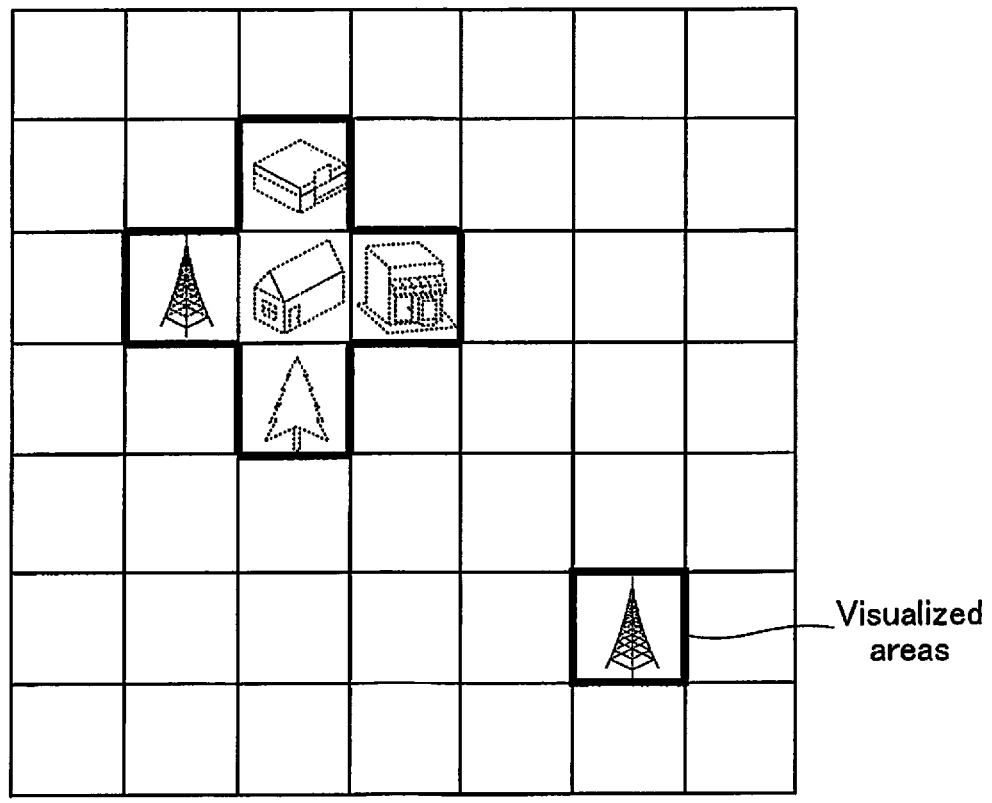
FIG. 17A illustrates an example for setting visualized areas according to a second embodiment.
Figure 17B:
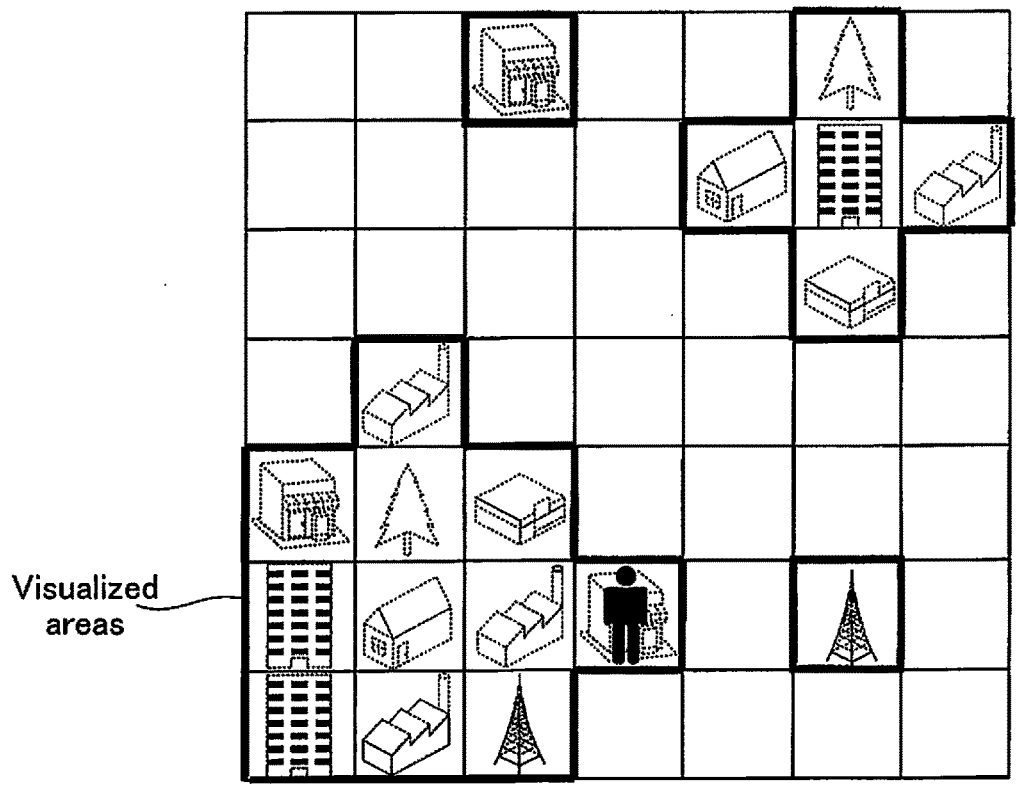
FIG. 17B illustrates an example for setting visualized areas according to the second embodiment.

A setting example of visualized areas according to the present embodiment is illustrated in FIGS. 17A and 17B. FIG. 17A illustrates an example of visualized areas provided to a game-playing user in the case in which many users access to an area 3-3 during a period of time. FIG. 17B illustrates an example of visualized areas provided to a game-playing user in the case in which extremely many users access to an area 6-2 during a period of time while many users access to an area 2-6 during the predetermined period of time. As illustrated, the visualized areas may be set based on a number of users accessing each area during a period of time, independently of the user position. This allows visualized areas to be set for areas to which a large number of users are accessing. A user can therefore feel playing with the other users cooperatively. That is, the user can feel a sense of unity with the other users.

Differences from the first embodiment in terms of functions will be described below.

Figure 18:
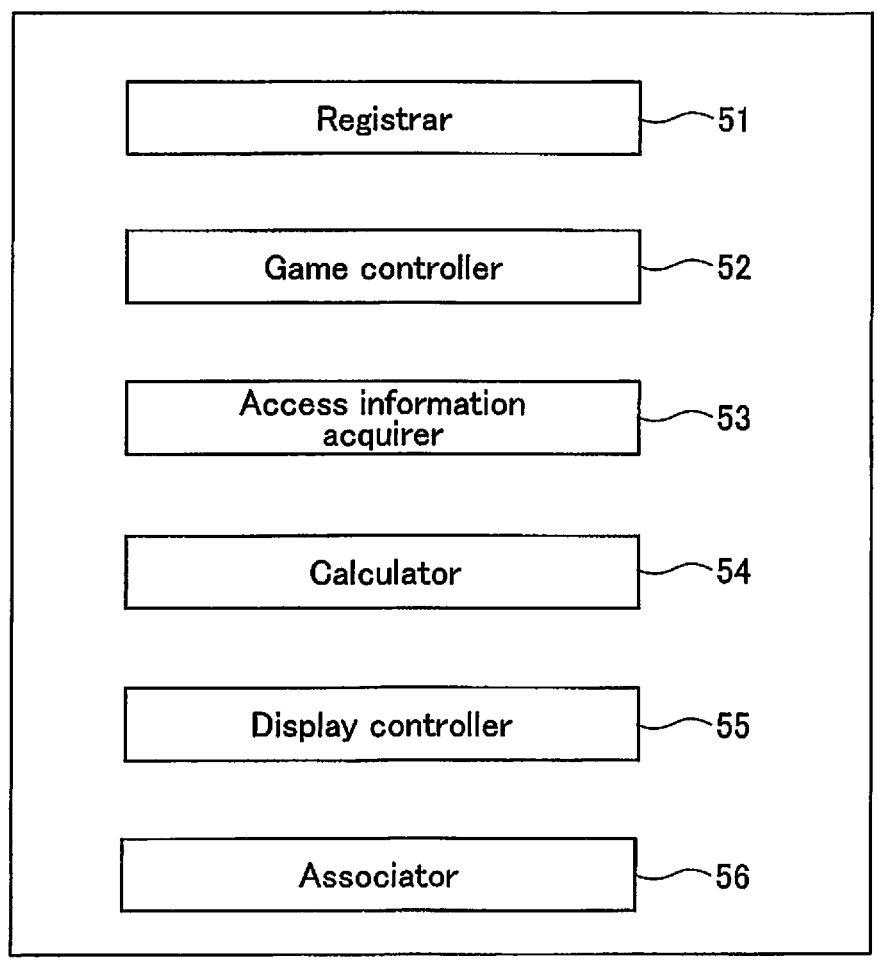
FIG. 18 is a functional block diagram for explaining functions playing main rolls in the game control device according to the second embodiment.

The functional block diagram illustrated in FIG. 18 is different from that illustrated in FIG. 12 in that the associator 56 is added.

The associator 56 is configured to associate the user with at least one of a plurality of areas set in the game based on the user access information to the game.

In the present embodiment, the calculator 54 includes a function for calculating a number of users associated by the associator 56 for every area.

Then function of the calculator 54 and the associator 56 in the present embodiment may be realized as described below. The CPU 21 of the games server 20, as illustrated in FIG. 13, records user access information in the database server 32 as log data, every time access occurs based on user ID. In an example of FIG. 13, each access is recorded for an area selected by the user. That is, the user and the area are correlated.

Figure 19A:
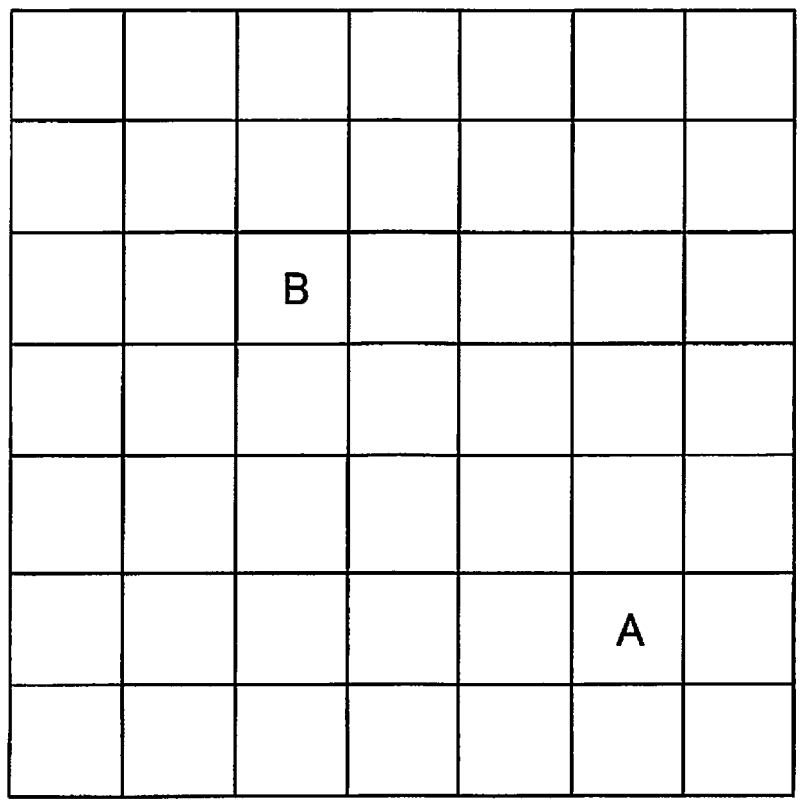
FIG. 19A conceptually illustrates an example of a calculation result of number of users for every area according to the second embodiment.
Figure 19B:
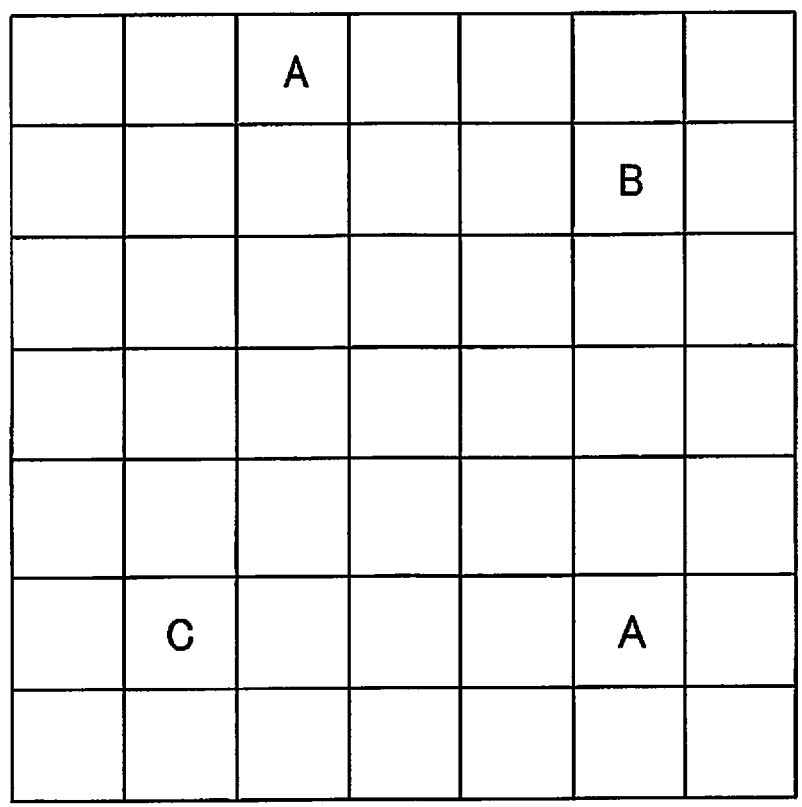
FIG. 19B conceptually illustrates an example of a calculation result of number of users for every area according to the second embodiment.

CPU 21 refers to log data in the game database 32, and then calculates for every area a number of users accessing during the predetermined period of time beginning from login time of a user to be processed. Alternatively, CPU 21 refers to log data in the game database 32 every time access occurs from a user to be processed and then calculates for every area a number of users accessing during the predetermined period of time beginning from access time of the user to be processed. FIGS. 19A and 19B each conceptually illustrates calculated number of users for every area on a map. FIGS. 19A and 19B correspond to FIGS. 17A and 17B respectively.

In FIGS. 19A and 19B, a character "A" represents that the calculated number of users ranges from 100 to 1,000. A character "B" represents that the calculated number of users ranges from 1,001 to 10,000. A character "C" represents that the calculated number of users is greater than 10,001. Areas on which any character is not indicated mean that the calculated number of users is less than 100, for example.

In the present embodiment, the display controller 55 is configured to define a region in a game image visible for game-playing users among a plurality of areas based on a number of users calculated for every area.

The function of the display controller 55 in the present embodiment may be realized as described below. For example, data that correlates a number of users accessing for each area during a period of time beginning from a reference time, with a region of visualized areas on the basis of each area, is memorized in the RAM 23 of the game server 20. This data may be similar data to that illustrated in FIG. 15; however, in the present embodiment, visualized areas to be set is determined for each area. That is, in the present embodiment, "Number of users accessing during a period of time" in FIG. 15 means a number of users for each area, while "Visualized areas" in FIG. 15 is set for each area. Resultantly, if the calculated numbers of users are those illustrated in FIGS. 19A and 19B, the CPU 21 determines visualized areas as illustrated in FIGS. 17A and 17B and then generates HTML data for displaying a web page including that visualized areas. If a spy character is located in any area in the determined visualized areas, the spy character is displayed in any area in the map.

Note that, although a flowchart for the game control device executing the game in the present embodiment is not illustrated, calculation of the number of users may be executed for each are in Step S20 of FIG. 16.

In the present embodiment, the calculator 54 may calculate for each area a number of users whose access frequency is greater than a give value.

In order to realize the function of the calculator 54 in this case, the CPU 21 of the game server 20 counts for each area a number of times that respective users access every certain time period of time (twelve hours for example). Then, the CPU 21 calculates for each area a number of users for which counted value is greater than a given value (five, for example). The value of the access frequency is updated every certain period of time, and the region of the visualized areas is updated accordingly.

(8) Modified Examples (8-1) Modified Example 1

In the present modified example, user access information includes operation contents when respective users access to the game.

The calculator 54 calculates a number of users whose operation content in accessing during a period of time is identical to that of the game-playing user.

In the embodiment described above, identical operation content for users may be, but not limited to, an operation for selecting an identical area, for example. Such operation content may be defined in accordance with a game content or a game scenario being applied. Such operation content may be an operation for instructing an identical direction or may be an operation for playing a battle against an identical game character (a boss character, for example).

In this modified example, a region visible to a game-playing user is determined based on a number of users whose operation content in accessing during a period of time is identical to that of the game-playing user. Thus, the number of users being under an identical scene or under an identical circumstance to the game-playing user reflects the region visible to the game-playing user. Therefore the game-playing user can feel as if he or she played the game in cooperation with the other users.

The present modified example may be realized as described below. The CPU 21 of the game server 20 records user access information every time access occurs based on user ID in log data in the game database 32. FIG. 20 illustrates a modified example of configuration of log data. As illustrated in FIG. 20, the log data is data that represents access time and information of operation contents of a user in order of access time for every user ID. When access occurs based on an operational input of the game-playing user, the CPU 21 refers to the log data and obtains a number of users accessing during a period of time based on the identical operational input to the game-playing user's input. Then, the CPU 21 refers to the data of FIG. 15 and determines a region of visualized areas as information amount in the game based on the obtained number.

(8-2) Modified Example 2

In the embodiment described above, the case was explained in which the calculator 54 calculates a number of users accessing to the game during a period of time beginning from a time when a game-playing user logs in or during a period of time beginning a time when access occurs due to an operational input of a game-playing user. However, in applying the game of the above-described embodiment to a social network game to which extremely many users access at arbitrary times, calculation processing load may be too heavy when CPU calculates a number of users accessing to the game during a period of time beginning a time when access occurs due to an operational input of a game-playing user. In view of the above, the calculator 54 may periodically calculate a number of users accessing to the game based on user access information acquired by the access information acquirer 53. The display controller 55 displays a region in a game image visible by the game-playing user based on the latest number of users calculated by the calculator 54. The display controller 55 may display the region when the game-playing user accesses to the game or when the game-playing user accesses based on an operational input in the game. This allows balanced load of processing, because calculation of the number of users is periodically executed, and such calculation is not required upon arbitral access of respective users.

In order to realize the present modified example, the CPU 21 of the game server 20 periodically accesses to the game database 32 to refer to the log data and calculates a number of users accessing to the game to record the same. Then, when access occurs based on login of the user to be processed or an operational input from the user to be processed, the CPU 21 reads out the latest recorded data of the number of users.

The exemplary embodiments of the present invention have been explained in detail. However, the present invention is not limited to the aforementioned exemplary embodiments. Further, it is apparent that a variety of changes and modifications can be made for the respective exemplary embodiments without departing from the scope of the present invention. Each of the technical features described in the aforementioned embodiments and the modified examples may be combined so long as inconsistency does not occur.

For example, in each embodiment, the calculator 54 calculates a number of users accessing during a period of time. Meanwhile, the calculator 54 may calculate a number of users who are friends of the game-playing user and performs access during a period of time. This motivates a user to login to the game together with the user's friend(s) in order to enlarge visualized areas in the game. Resultantly, friends playing together are expected to proceed the game while helping or communicating each other. Thereby a game with entertainment and collaborative with friends is realized, and social communication is enhanced.

Note that the CPU 21 may refer to user data of the user to be processed for identifying the user's friends in order to calculate a number of users accessing during the period of time.

In the second embodiment as described above, the calculator 54 associates a user with at least one of a plurality of areas configured in the game based on access information from the communication terminal of the user. The calculator 54 then calculates a number of associated users for every area. With the game as described above, an operational input is performed for any area by a user (that is, a user's operation is performed to select any area), and access information includes such operational input result; however, the present invention is not limited to such case. A game may be assumed in which association of a user with any area may not be triggered by a user's operational input. For example, in the case in which GPS (Global Positioning System) signal indicating a user's location is automatically notified from the communication terminal 10 to the game server 20 when login or access occurs, the user may be associated with an area in the map in the game. The area that the user is associated with is determined in accordance with a place where the user is present based on the GPS signal.

While an example has been described in which a social network game is realized on a user's communication terminal, the game for which the present invention may be applied is not limited to the social network game. For example, an online game system may be applied in which a server device on a network and a home online game machine are connected. With such online game system, progress of the game can be controlled in the same way as the embodiments described above.

While a configuration has been described in which the functions illustrated in FIG. 12 are realized by the game server 20 and the database server 30 on a network, the above present invention is not limited to this configuration. All of the means may be configured to be realized by the communication terminal 10, or a portion of the means may be configured to be realized by the communication terminal 10. Because the communication terminal 10 and the game server 20 may have the substantially same hardware configuration, the functions can be also realized by the communication terminal 10 as described in the above embodiments. For example, in the embodiments described above, communication terminal 10 of respective users acquires access information by sequentially receiving the same from the game server 20. Alternatively, the communication terminal 10 of respective users acquires calculation result of a number of users accessing by receiving the same from the game server 20. Then, the communication terminal 10 may record the acquired information in a storage device (RAM 13, or a large capacity storage device and the like such as a hard disk drive (HDD) which is not illustrated).

<Appendix>

Aspects of the present invention are disclosed hereinafter.

A first aspect of the present invention is a game control device. This game control device includes:

an acquirer configured to acquire user access information for a user to a game;

a calculator configured to calculate a number of users accessing to the game during a period of time or a number of users accessing to the game at a greater frequency than a given value, based on the user access information acquired by the acquirer; and a display controller configured to display a larger region in a game image visible by a game-playing user, as the number of users calculated by the calculator increases.

"Access" in this game control device may be login access by transmitting from the communication terminal information required for authentication, or may be access by transmitting information regarding operational inputs in the game after login. "Accessing during a period of time" means that, for example, access occurs from a communication terminal at least once during a past period of time based on the present time, etc. and does not necessarily mean that continuous access or consecutive accesses should occur during the past period of time. "Frequency" in the game control device described above indicates a number of times for which accesses from a user occur during a fixed period of time.

According to this game control device, as the greater number of accesses from users occur during the period of time, a region of visualized areas in the game image becomes larger for a game-playing user, namely a game-playing user. Then, the game-playing user can have a feeling of reality with regard to the number of login users. The game-playing user can feel overall excitement of the game, and therefore feel a sense of unity with other users.

This game control device may further include an associator configured to associate the user with at least one of a plurality of areas set in the game, based on the user access information to the game, wherein the calculator calculates for every area the number of users associated by the associator, and the display controller sets the region visible to the game-playing user among the plurality of areas based on the number of users calculated for every area.

This allows to widen the region visible to the game-playing user with respect to areas with which a large number of users are associated, and the game-playing user can feel playing with the other users cooperatively. That is, the user can feel a sense of unity with the other users.

This game control device may further include a registrar configured to correlate users and register the correlation of the users, wherein the calculator calculates the number of users, the users being correlated with the game-playing user and accessing during the period of time.

Resultantly, a user is motivated to login together with a friend user such that a region visible in the game becomes large. Thus, the friends playing together are expected to proceed the game while helping or communicating each other. Thereby a game with entertainment and collaborative with friends is realized, and social communication is enhanced.

In this game control device, the calculator calculates the number of users after an operational input of the game-playing user in the game is recognized. Because, for example, the user does not necessarily access immediately after the user logs in, accuracy of the calculated number of users becomes higher by calculating the same based on a time when the access occurs based on the operational input in the game.

Note that "operational input in the game" corresponds to a selection operation in search processing, or to a selection operation to select an area in embodiments which are described above.

In this game control device, the user access information to the game includes an operation content of a user when the user accesses to the game, and the calculator calculates the number of users, the users executing an identical content to that of the game-playing user when accessing during the period of time.

"Identical operation content" between users may be defined arbitrarily. Such operation content may be, for example, an operation content indicating an identical moving direction, or an operation content for executing a battle with an identical game character. According to this configuration, a region visible to a game-playing user is determined based on a number of users whose operation content in accessing during a period of time is identical to that of the game-playing user. Thus, the number of users being under an identical scene or under an identical circumstance to the game-playing user reflects a region visible to the game-playing user, and therefore the game-playing user can feel as if he or she played the game in cooperation with the other users.

In this game control device, the calculator periodically calculates the number of users accessing to the game, based on the user access information acquired by the acquirer, and the display controller displays the region in a game image visible by the game-playing user based on the latest number of users calculated by the calculator. This configuration allows balanced load of processing, because calculation of the number of users is periodically executed, and that calculation is not executed upon arbitral access of respective users.

A second aspect of the present invention is a game control method. This game control method includes:

acquiring user access information for a user to a game;

calculating a number of users accessing to the game during a period of time or a number of users accessing to the game at a greater frequency than a given value, based on the user access information acquired by the acquiring; and displaying a larger region in a game image visible by a game-playing user, as the number of users calculated by the calculating increases.

A third aspect of the present invention is a non-transitory computer-readable recording medium containing a program for enabling a computer to perform a method, the method comprising:

acquiring user access information for a user to a game;

calculating a number of users accessing to the game during a period of time or a number of users accessing to the game at a greater frequency than a given value, based on the user access information acquired by the acquiring means; and displaying a larger region in a game image visible by a game-playing user, as the user number calculated by the calculating increases.

The computer may be, for example, a network server, or a large computer, etc. This program may be stored in a computer-readable information storage medium, such as DVD-ROM, CD-ROM, etc. That is, a fourth aspect of the present invention is a computer-readable storage medium in which the program described above is recorded.

A fifth aspect of the present invention is a game system that includes a communication terminal operated by a user and a server controlling execution of a game with the communication terminal, the game system comprising:

an acquirer configured to acquire user access information for the user to the game;

a calculator configured to calculate a number of users accessing to the game during a period of time or a number of users accessing to the game at a greater frequency than a given value, based on the user access information acquired by the acquirer; and a display controller configured to display a larger region in a game image visible by a game-playing user, as the number of users calculated by the calculator increases.

What is claimed is:

1. A game control device comprising:
    an acquirer configured to acquire user access information for a user of a game;
    a calculator configured to calculate a number of users accessing the game during a period of time or a number of users accessing the game at a greater frequency than a given value, based on the user access information acquired by the acquirer; and
    a display controller configured to display a game playing region in a game image visible by a game-playing user, and configured to increase a size of the game playing region in the game image as the number of users calculated by the calculator increases wherein the size and shape of the game playing region is determined by the calculated number of users.

2. The game control device according to claim 1, further comprising
    an associator configured to associate the user with at least one of a plurality of areas set in the game, based on the user access information to the game, such that the calculator calculates for every area the number of users associated by the associator and the display controller sets a region visible to the first user among the plurality of areas based on the number of users calculated for every area.

3. The game control device according to claim 1, further comprising
    a register configured to correlate users and register the correlation of the users, such that the calculator calculates the number of users, the users being correlated with the game-playing user and accessing the game during the period of time.

4. The game control device according to claim 1, wherein the calculator calculates the number of users after an operational input of the game-playing user in the game is recognized.

5. The game control device according to claim 1, wherein
    the user access information to the game includes an operation content of a user when the user accesses the game; and
    the calculator calculates the number of users executing an operation of the operation content identical to that being executed by the game-playing user when the users access the game during the period of time.

6. The game control device according to claim 1, wherein the calculator periodically calculates the number of users accessing the game, based on the user access information acquired by the acquirer; and
the display controller displays the region in a game image visible by the game-playing user based on the latest number of users calculated by the calculator.

7. A game control method comprising:
acquiring user access information for a user of a game;
calculating a number of users accessing the game during a period of time or a number of users accessing the game at a greater frequency than a given value, based on the user access information acquired by the acquiring; and
displaying a game playing region in a game image visible by a game-playing user, and increasing a size of the game playing region in the game image as the number of users calculated by the calculating increases wherein the size and shape of the game playing region is determined by the calculated number of users.

8. A non-transitory computer-readable recording medium containing a program for enabling a computer to perform a method, the method comprising:
acquiring user access information for a user of a game;
calculating a number of users accessing the game during a period of time or a number of users accessing the game at a greater frequency than a given value, based on the user access information acquired by the acquiring; and
displaying a game playing region in a game image visible by a game-playing user, and increasing a size of the game playing region in the game image as the number of users calculated by the calculating increases wherein the size and shape of the game playing region is determined by the calculated number of users.

9. A game system that includes a communication terminal operated by a user and a server controlling execution of a game with the communication terminal, the game system comprising:
an acquirer configured to acquire user access information for the user of the game;
a calculator configured to calculate a number of users accessing the game during a period of time or a number of users accessing the game at a greater frequency than a given value, based on the user access information acquired by the acquirer; and
a display controller configured to display a game playing region in a game image visible by a game-playing user, and configured to increase a size of the game playing region in the game image as the number of users calculated by the calculator increases wherein the size and shape of the game playing region is determined by the calculated number of users.

* * * * *